(12) United States Patent
Yanko et al.

(10) Patent No.: US 9,665,746 B2
(45) Date of Patent: *May 30, 2017

(54) SECURE SMARTCARD READER

(71) Applicant: VERIFONE, INC., San Jose, CA (US)

(72) Inventors: Igal Yosef Yanko, Rocklin, CA (US); Scott William McKibben, Davis, CA (US); John Henry Barrowman, Knoxville, TN (US)

(73) Assignee: VeriFone, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,629

(22) Filed: Apr. 14, 2016

(65) Prior Publication Data

US 2016/0267299 A1 Sep. 15, 2016

Related U.S. Application Data

(63) Continuation of application No. 14/787,143, filed as application No. PCT/IL2015/050851 on Aug. 25, 2015.

(60) Provisional application No. 62/050,866, filed on Sep. 16, 2014.

(51) Int. Cl.
  G06K 7/06 (2006.01)
  G06K 7/00 (2006.01)
  G06K 19/07 (2006.01)

(52) U.S. Cl.
  CPC ........... G06K 7/065 (2013.01); G06K 7/0013 (2013.01); G06K 19/07 (2013.01)

(58) Field of Classification Search
  CPC ......... G06F 3/08; G06K 17/00; G06K 7/0008
  USPC .................................................. 235/435, 441
  See application file for complete search history.

(56) References Cited

U.S. PATENT DOCUMENTS

| | | | | |
|---|---|---|---|---|
| 2007/0095910 | A1* | 5/2007 | Gallagher | G06K 7/0013 235/438 |
| 2008/0121706 | A1* | 5/2008 | Defibaugh | G06K 13/08 235/441 |
| 2008/0164320 | A1* | 7/2008 | Garrido-Gadea | G06K 7/0013 235/486 |
| 2009/0042433 | A1* | 2/2009 | Bushby | H01R 13/4538 439/352 |
| 2013/0298252 | A1* | 11/2013 | Ribeiro-Pereira | H05K 1/0275 726/26 |

* cited by examiner

Primary Examiner — Daniel St Cyr
(74) Attorney, Agent, or Firm — Hunton & Williams LLP

(57) ABSTRACT

A secure smartcard reader including a smartcard connector and a flexible printed circuit board wrapped around and at least partially surrounding the smartcard connector and at least partially defining a security volume enclosing the smartcard connector, the wrapped flexible printed circuit board defining on an outer-facing surface thereof a plurality of keypad contacts, the wrapped flexible printed circuit board defining electrical conductors connecting the plurality of keypad contacts to connector pads and the wrapped flexible printed circuit board defining a protective anti-tamper mesh protecting the electrical conductors.

20 Claims, 23 Drawing Sheets

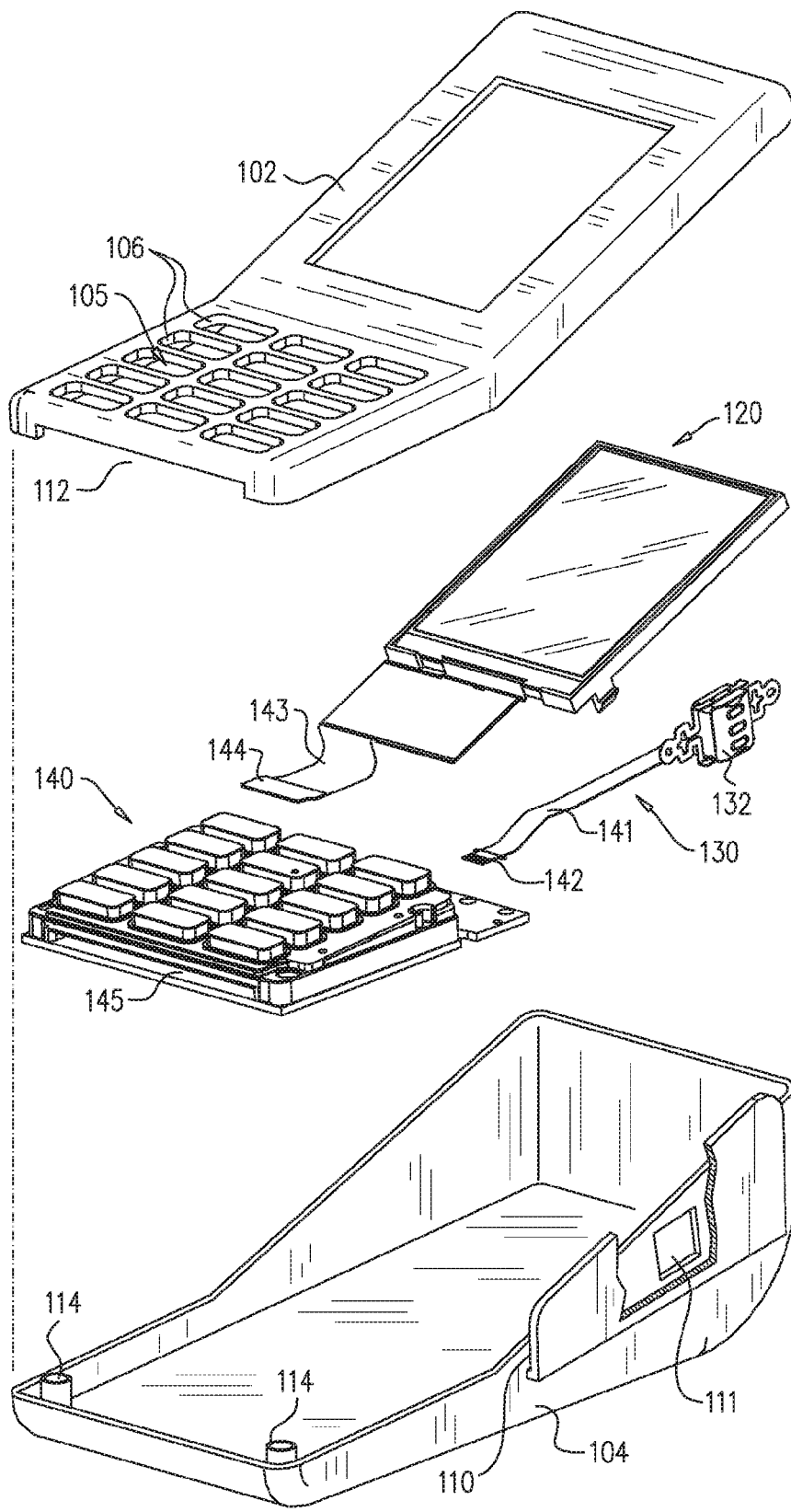

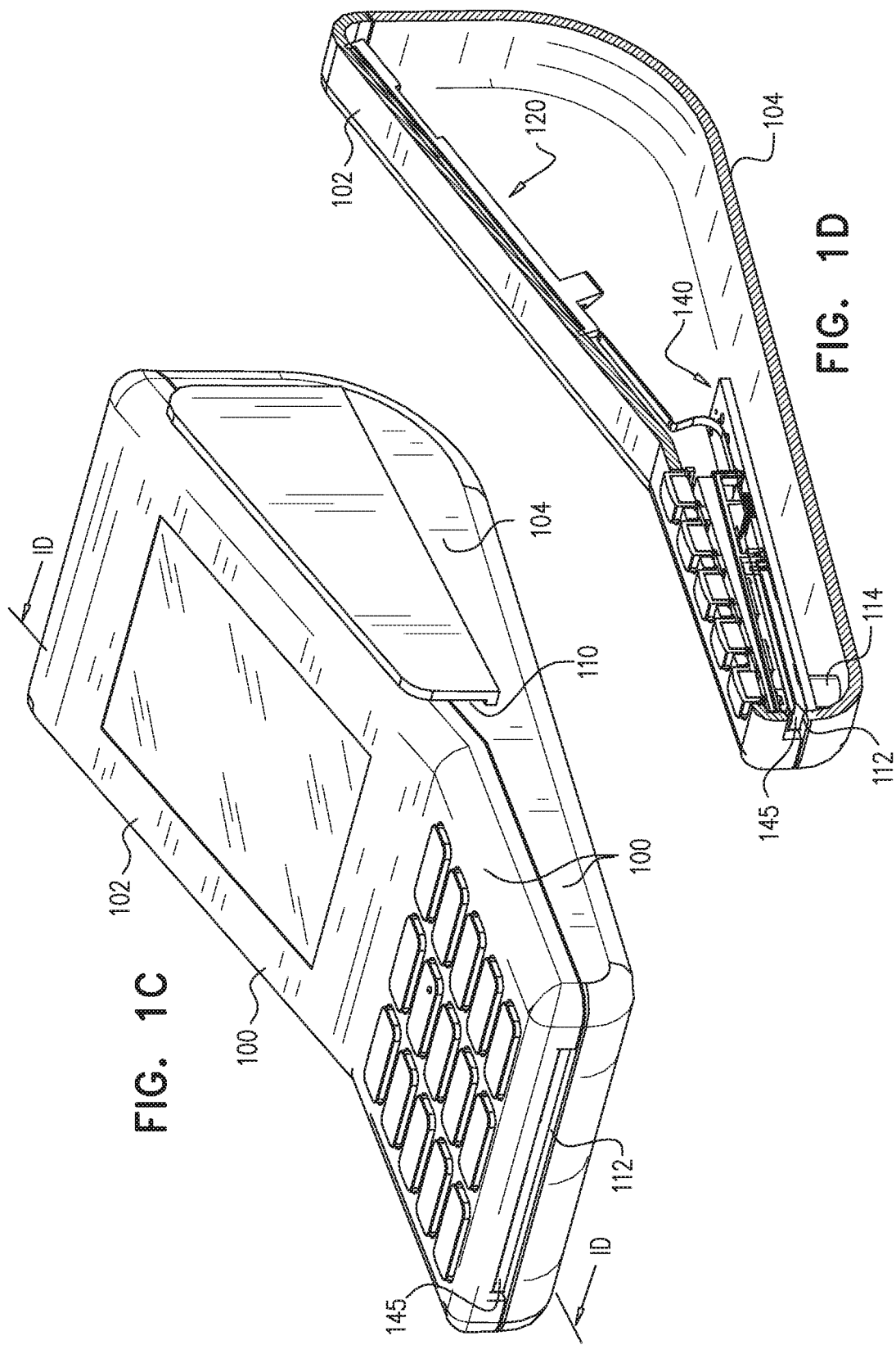

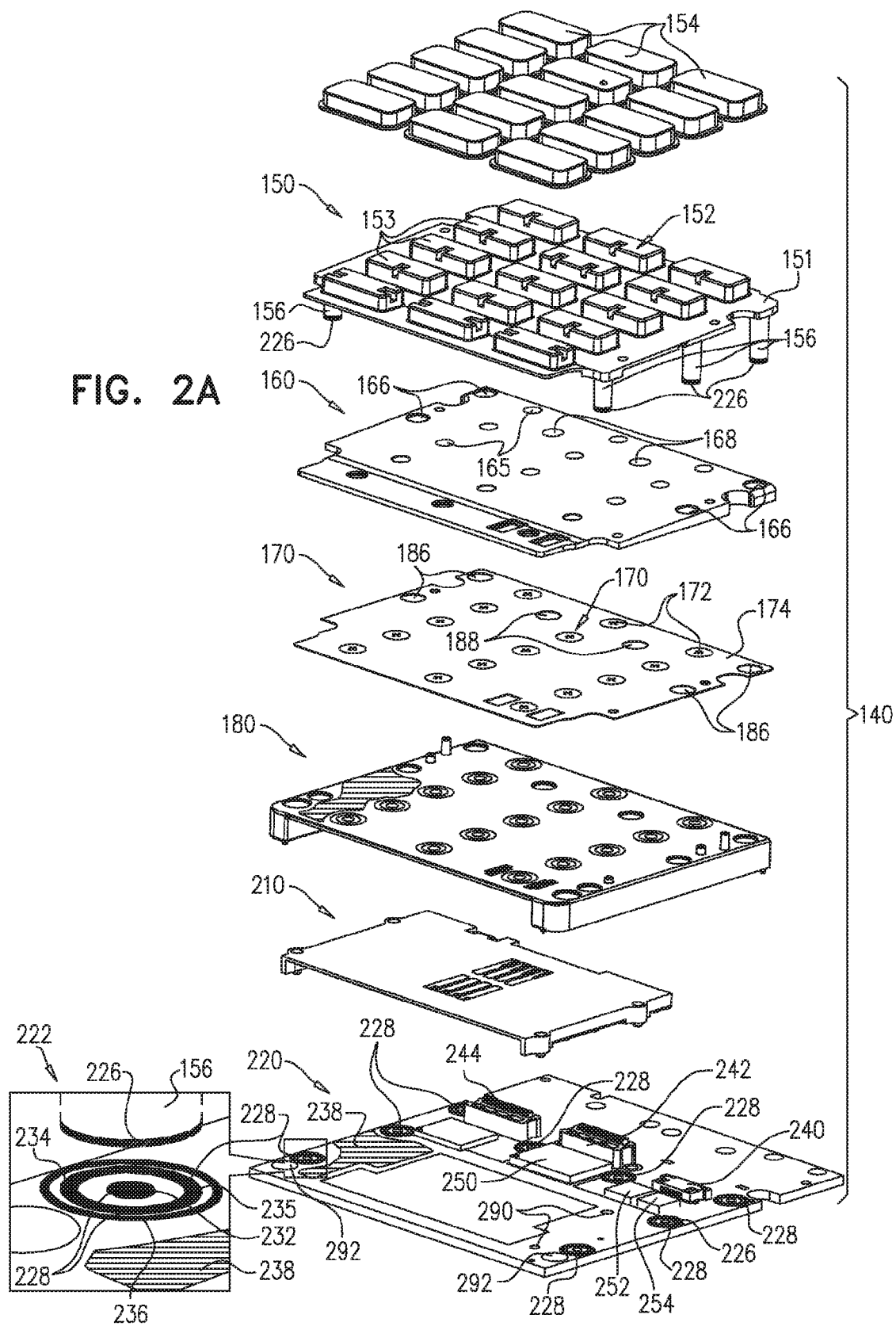

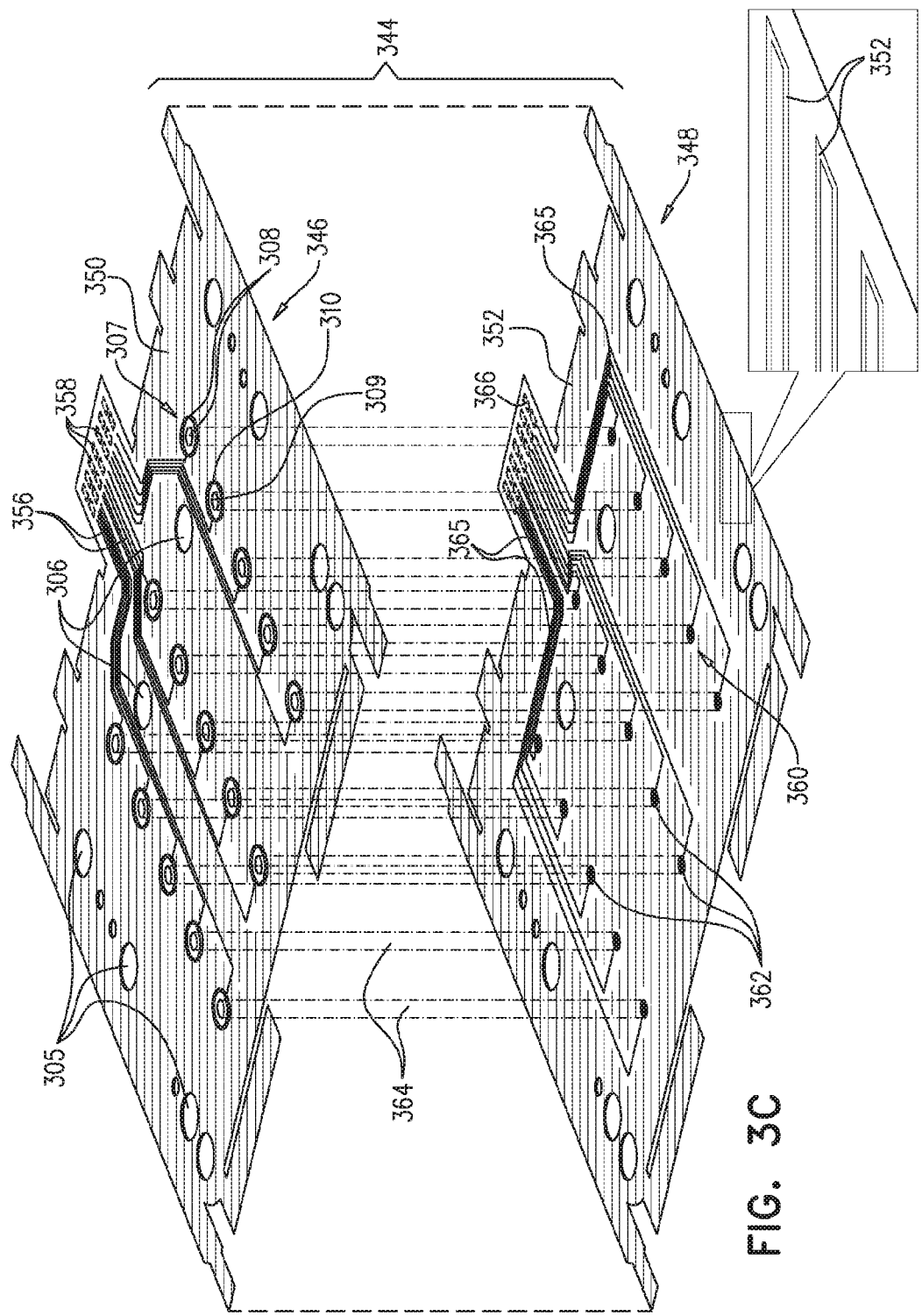

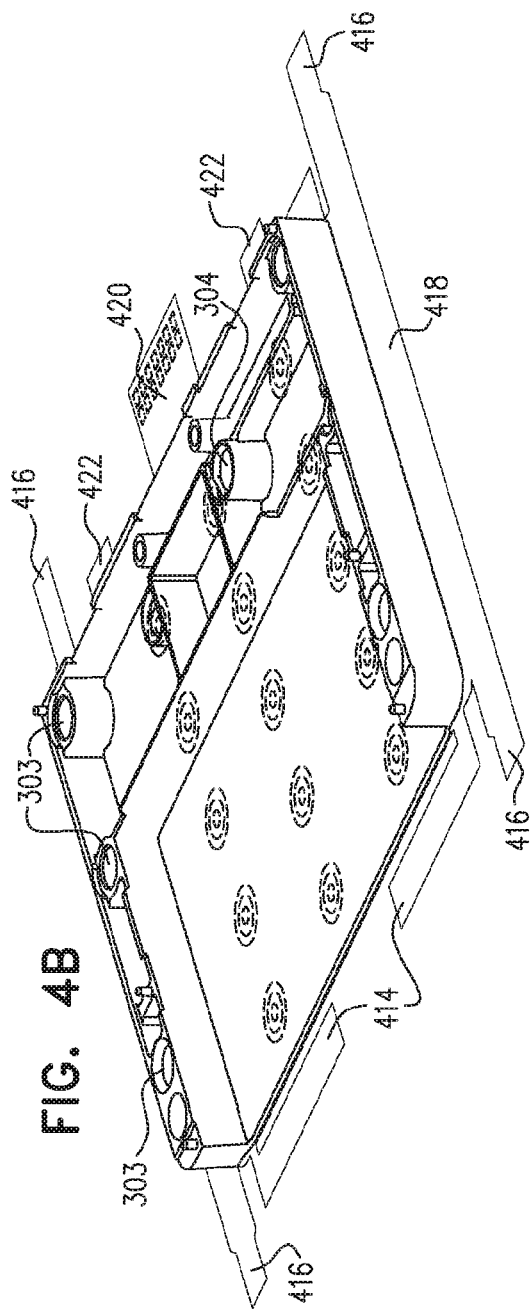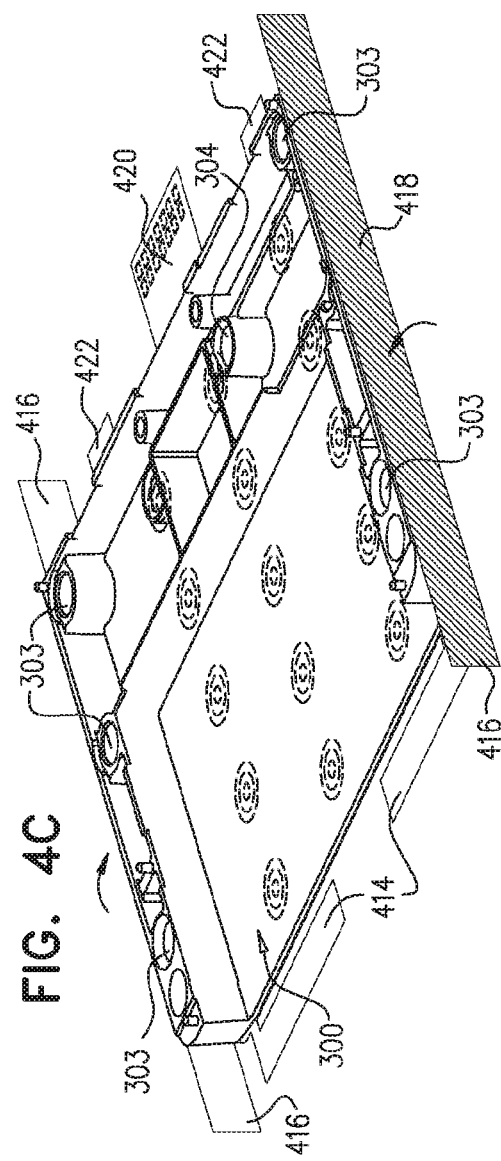

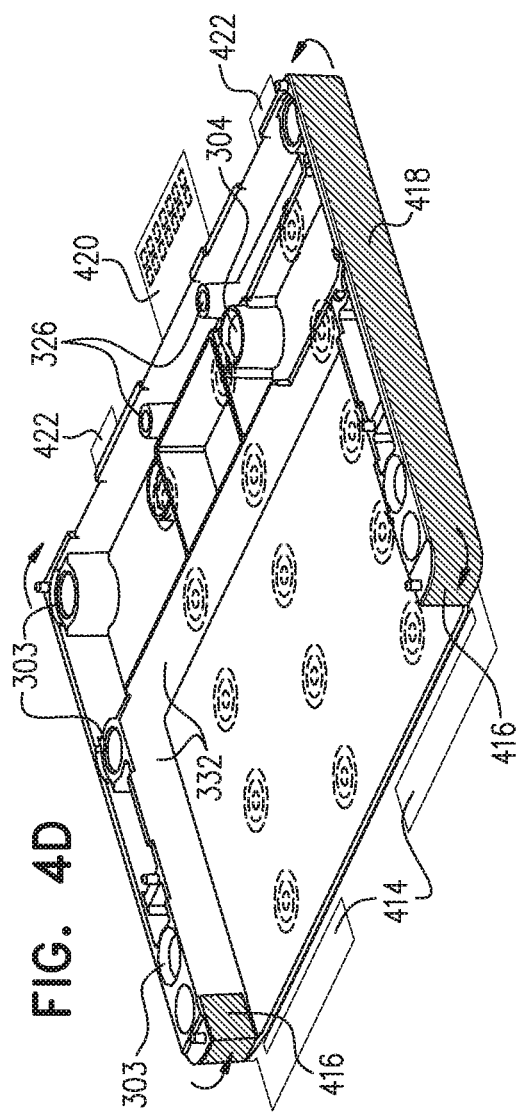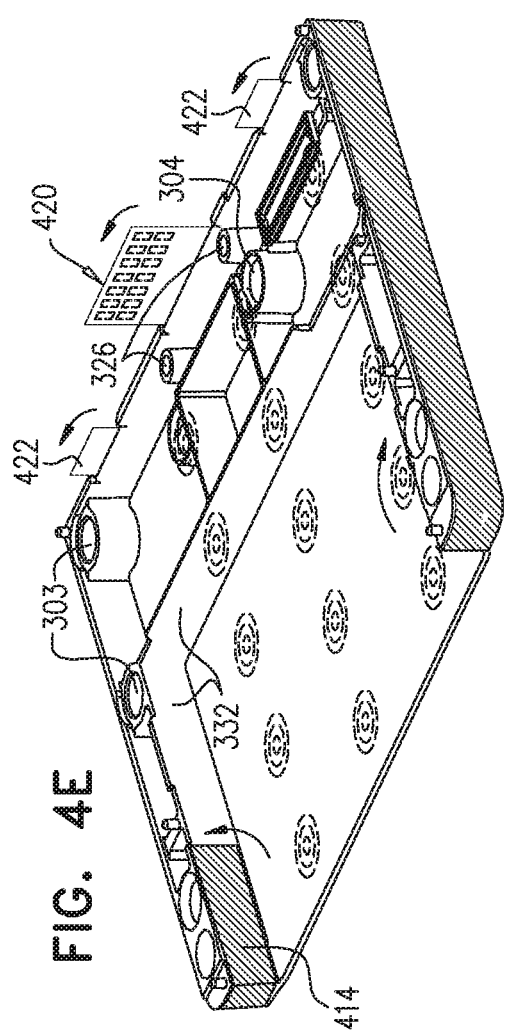

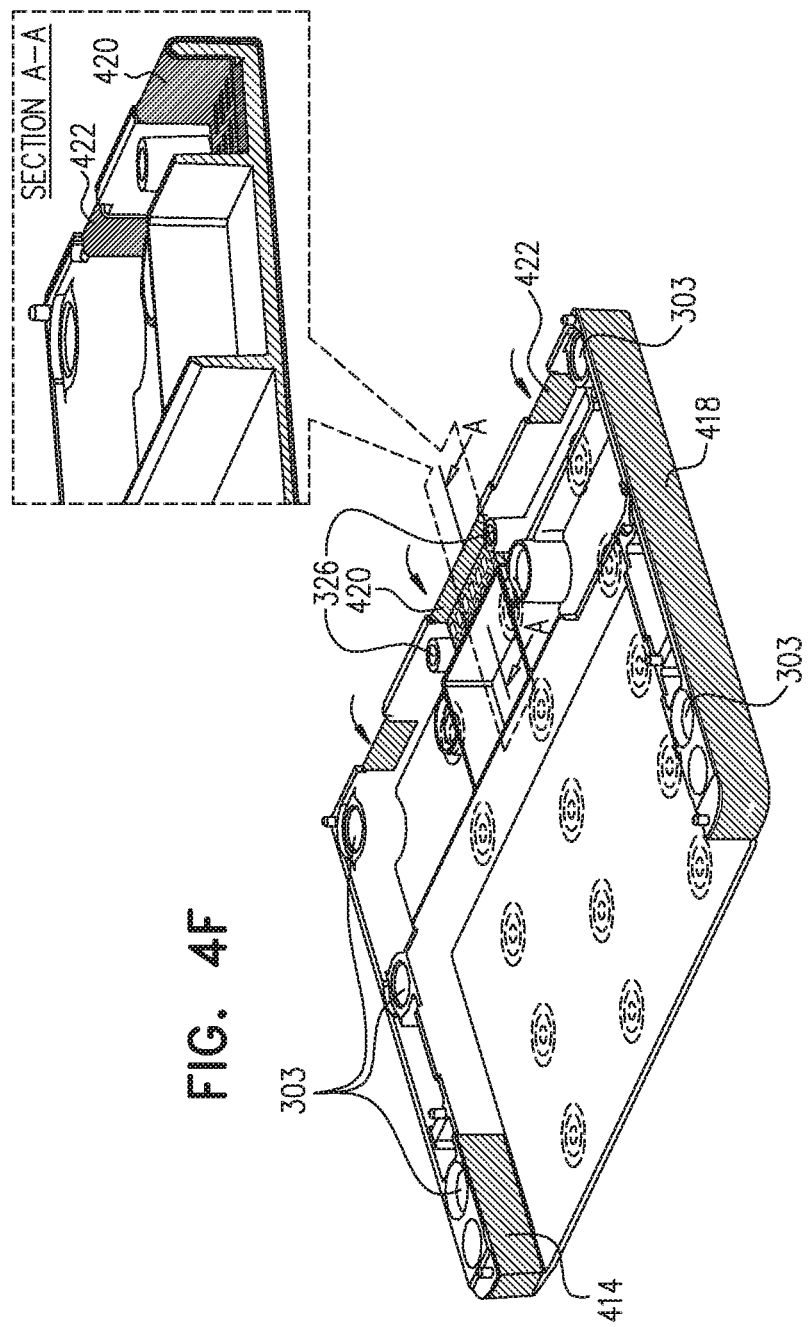

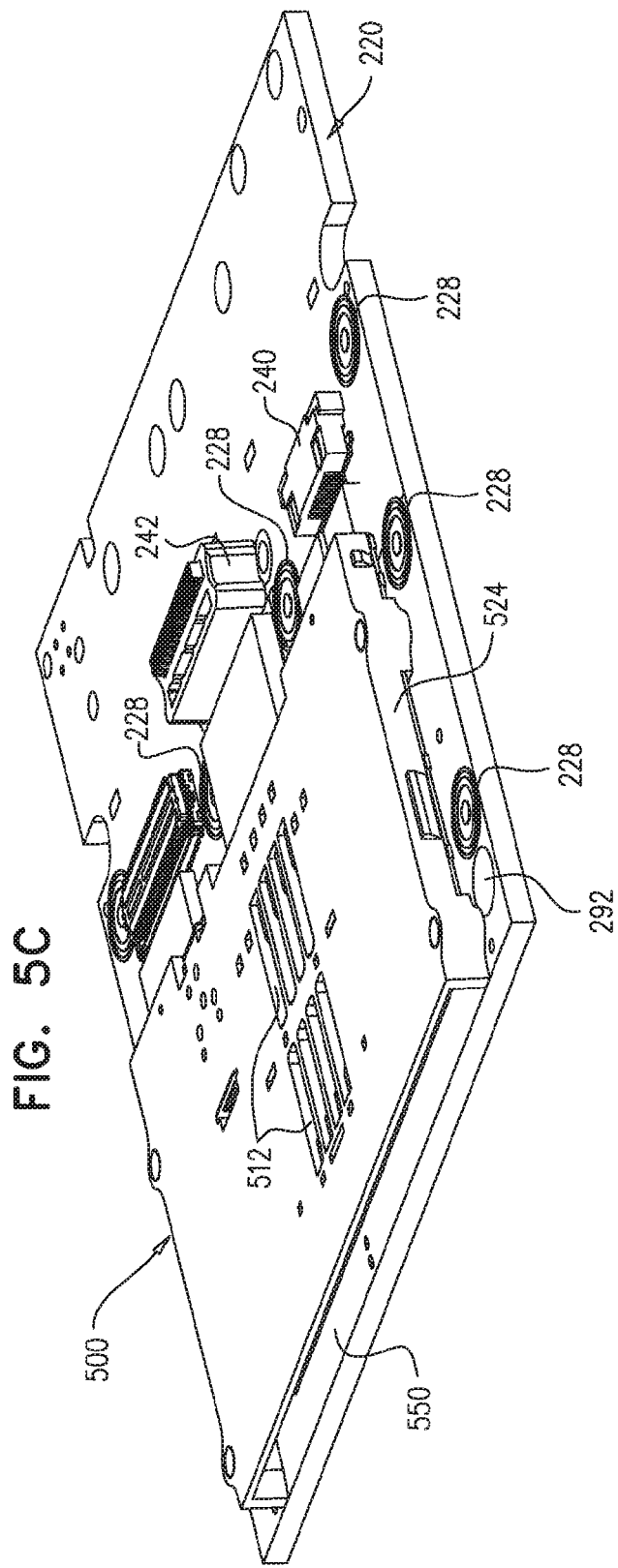

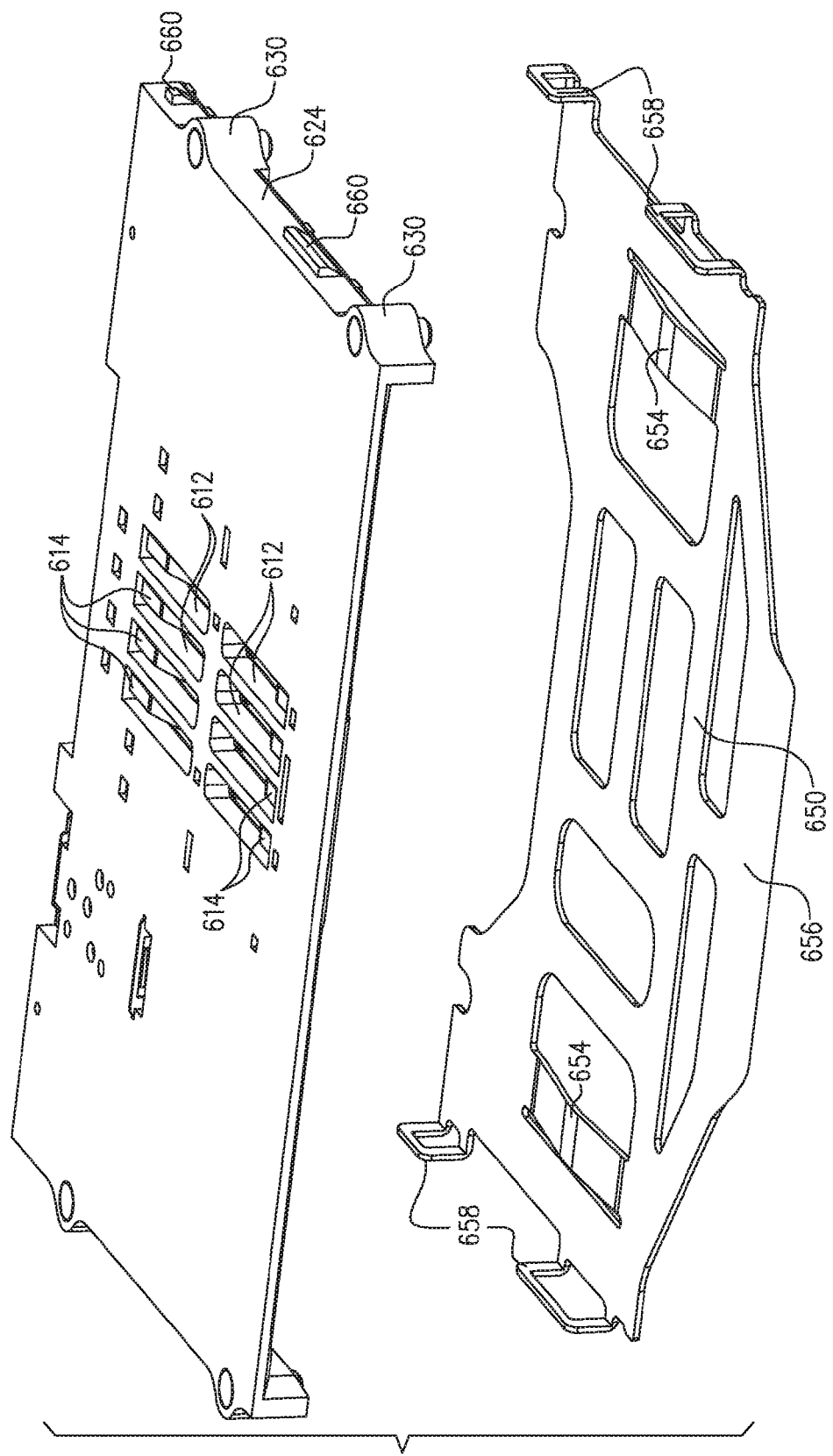

SECURE SMARTCARD READER

REFERENCE TO RELATED APPLICATIONS

This application is a continuation of U.S. patent application Ser. No. 14/787,143, filed Oct. 26, 2015, entitled SECURE SMARTCARD READER, which is a National Phase Application of PCT Application No. PCT/IL2014/050375, filed Aug. 25, 2015, which claims priority of U.S. Provisional Patent Application Ser. No. 62/050,866, filed Sep. 16, 2014 and entitled "SECURE THIN DATA ENTRY DEVICE", the disclosures of which are incorporated by reference in its entirety.

FIELD OF THE INVENTION

The present invention relates to data entry devices generally.

BACKGROUND OF THE INVENTION

Various types of data entry devices are known.

SUMMARY OF THE INVENTION

The present invention seeks to provide improved data entry devices.

There is thus provided in accordance with a preferred embodiment of the present invention a secure smartcard reader including a smartcard connector and a flexible printed circuit board wrapped around and at least partially surrounding the smartcard connector and at least partially defining a security volume enclosing the smartcard connector, the wrapped flexible printed circuit board defining on an outer-facing surface thereof a plurality of keypad contacts, the wrapped flexible printed circuit board defining electrical conductors connecting the plurality of keypad contacts to connector pads and the wrapped flexible printed circuit board defining a protective anti-tamper mesh protecting the electrical conductors.

Preferably, the secure smartcard reader also includes tamper detection and alarm circuitry which is coupled to the protective anti-tamper mesh. Additionally or alternatively, the secure smartcard reader also includes a keypad element cooperating with the plurality of keypad contacts.

In accordance with a preferred embodiment of the present invention the secure smartcard reader also includes a rigid PCB, which, together with the wrapped flexible printed circuit board, fully defines the security volume. Additionally, the rigid PCB also includes a protective anti-tamper mesh.

Preferably, the rigid PCB has first and second surfaces and both the smartcard connector and the plurality of keypad contacts are located adjacent the first surface of the rigid PCB. Additionally or alternatively, the rigid PCB has first and second surfaces and the security volume is located alongside the first surface.

In accordance with a preferred embodiment of the present invention the wrapped flexible printed circuit board includes at least inner and outer conductive layers, the at least outer conductive layer including at least a portion of the protective anti-tamper mesh and the at least inner conductive layer including at least some of the electrical conductors connecting the plurality of keypad contacts to connector pads. Additionally, the at least inner conductive layer includes ones of the electrical conductors which carry signals representing key presses.

Preferably, the secure smartcard reader also includes at least one tamper detector switch assembly which extends through at least one corresponding aperture in the wrapped flexible printed circuit board to normally engage at least one corresponding electrical contact.

There is also provided in accordance with another preferred embodiment of the present invention a thin smartcard reader including a printed circuit board having a first surface and a second surface and a smartcard connector located adjacent a first surface of the printed circuit board and defining with the printed circuit board a smart card reading slot.

There is further provided in accordance with yet another preferred embodiment of the present invention a thin smartcard reader including a printed circuit board having a first surface and a second surface and a smartcard connector located adjacent a first surface of the printed circuit board and including a slot surface defining element and a metal underplate defining with the slot surface defining element a smart card reading slot.

Preferably, a thickness of the smartcard reader is less than 2.8 mm.

In accordance with a preferred embodiment of the present invention a thickness of the smartcard reader is less than 2.5 mm.

Preferably, the thin smartcard reader also includes a keypad assembly located adjacent the first surface of the printed circuit board at least partially overlying the smartcard connector and a security volume enclosing at least part of the printed circuit board, at least part of the smartcard connector and at least part of the keypad assembly. Additionally, the security volume protects at least some electrical contacts of the keypad assembly.

In accordance with a preferred embodiment of the present invention the security volume includes a flexible circuit board bearing at least one security anti-tamper mesh which overlies and at least partially surrounds the smart card connector. Additionally, the flexible circuit board includes at least a portion that protects at least some electrical contacts of the keypad assembly.

Preferably, the printed circuit board defines part of the security volume.

In accordance with a preferred embodiment of the present invention the printed circuit board includes at least one protective anti-tamper mesh.

Preferably, the thin smartcard reader also includes tamper detection circuitry. In accordance with a preferred embodiment of the present invention the thin smartcard reader also includes at least one tamper detection switch assembly, communicating with the tamper detection security, monitoring the security volume.

BRIEF DESCRIPTION OF THE DRAWINGS

The present invention will be understood and appreciated more fully from the following detailed description, taken in conjunction with the drawings in which:

FIGS. 1A and 1B are simplified pictorial exploded view illustrations of a smart card data entry device constructed and operative in accordance with a preferred embodiment of the present invention, taken in respective downward and upward facing directions;

FIG. 1C is a simplified pictorial assembled view illustration of the smart card data entry device of FIGS. 1A & 1B;

FIG. 1D is a simplified sectional illustration taken along lines ID-ID in FIG. 1C;

FIGS. 2A and 2B are simplified exploded view illustrations of a security volume assembly forming part of the smart card data entry device of FIGS. 1A-1C, taken in respective downward and upward facing directions;

FIGS. 3C and 3D are simplified planar illustrations of two alternative embodiments of a subsequently folded element forming part of the subassembly of FIGS. 3A & 3B;

FIGS. 4A, 4B, 4C, 4D, 4E and 4F are simplified illustrations of steps in folding of the folded element of either of FIGS. 3C & 3D;

FIG. 5C is a simplified assembled view illustration of the subassembly of FIGS. 5A & 5B together with a printed circuit board shown in FIGS. 1A-2B, cooperating therewith;

FIG. 6D is a simplified exploded view illustration of the subassembly of FIGS. 6A and 6B;

DETAILED DESCRIPTION OF PREFERRED EMBODIMENTS

Figure 1B:
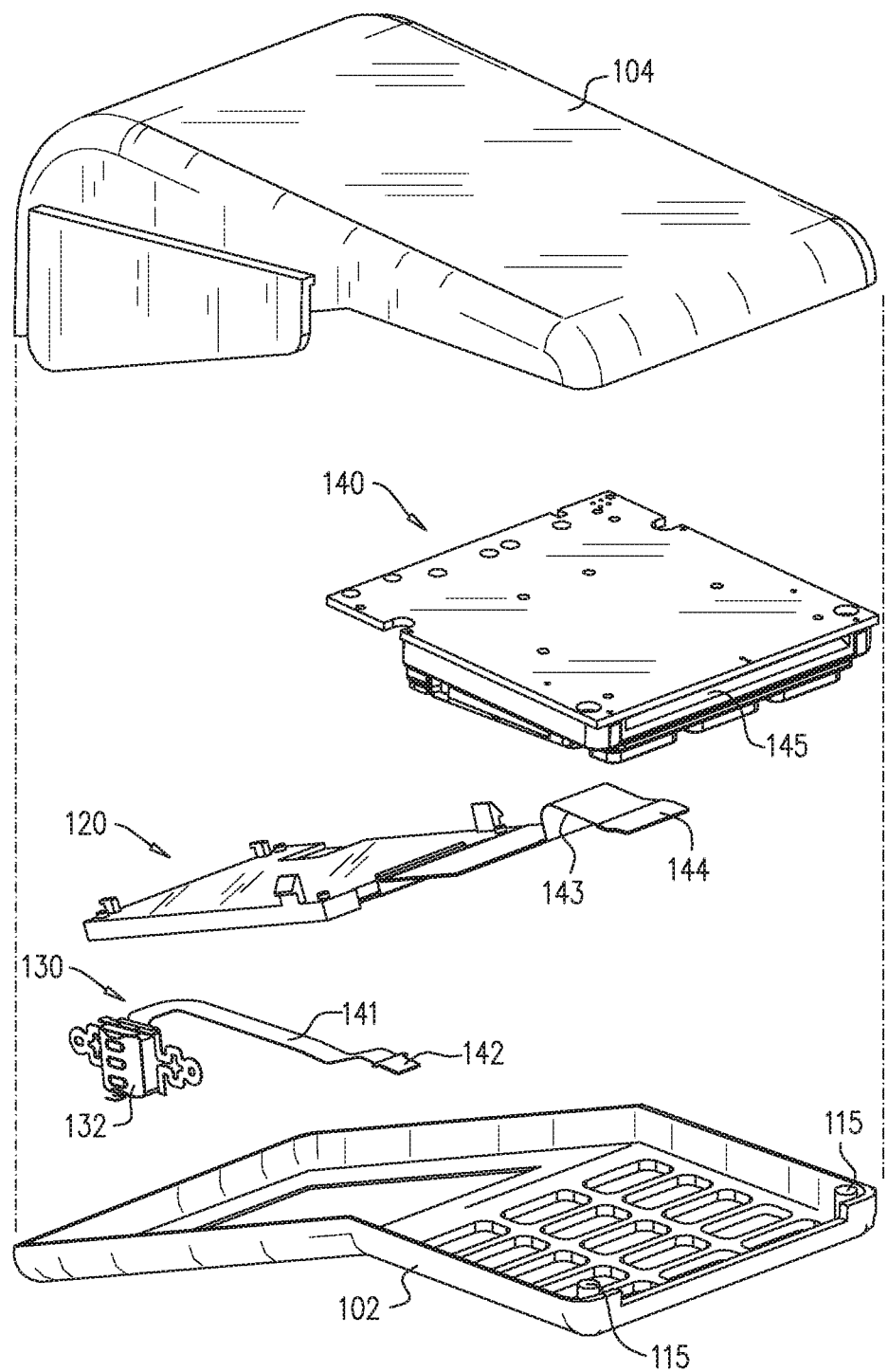

Reference is now made to FIGS. 1A and 1B, which are simplified pictorial exploded view illustrations of a machine readable card data entry device constructed and operative in accordance with a preferred embodiment of the present invention, taken in respective downward and upward facing directions, to FIG. 1C, which is an assembled view of the machine readable card data entry device, and to FIG. 1D, which is a simplified sectional illustration of the machine readable card data entry device of FIGS. 1A-1C.

As seen in FIGS. 1A-1D, the machine readable card entry data entry device preferably comprises a housing 100 including a top housing portion 102 and a bottom housing portion 104. Top housing portion 102 preferably defines an array 105 of key apertures 106. Bottom housing portion 104 preferably defines a magnetic card reading slit 110 having an aperture 111. Top and bottom housing portions preferably together define a smart card reading slot 112. Bottom housing portion 104 defines a plurality of upstanding bosses 114. Top housing portion 102 defines a plurality of downward facing bosses 115.

Located within housing 100 is an LCD assembly 120. LCD assembly 120 may optionally include a touchscreen panel, such as a LCM260-002-01-A, manufactured by GIANTPLUS TECHNOLOGY CO., LTD, 15 Industrial Road, Toufen, Miauli, Taiwan.

Also located within housing 100, adjacent slit 110, is a magnetic card reader subassembly 130. Magnetic card reader subassembly 130 preferably comprises a magnetic card reader head 132, typically a MSR252-011-01-A, manufactured by APOLLO (ZHUHAI) ELECTRONICS CO, Apollo Bldg., Lan-pu Industrial Area E, Jiuzhou Rd, Zhuhai, China, which is mounted into aperture 111.

Additionally located within housing 100 and preferably mounted onto bosses 114 and/or bosses 115, as seen particularly in FIG. 1D, is a security volume assembly 140, which is described hereinbelow in greater detail with reference to FIGS. 2A-7C and within which is defined a security volume. There is provided an electrical connection between magnetic card reader subassembly 130, typically via a flexible cable 141 and a connector 142, and circuitry located within security volume assembly 140. There is also provided an electrical connection between LCD assembly 120, typically via a flexible cable 143 and a connector 144, and circuitry located within security volume assembly 140.

It is appreciated that a smart card to be read may be inserted via slot 112 into operative engagement with an interior of the security volume assembly, as described in detail hereinbelow. Slot 112 is aligned with a corresponding smart card read/write slot 145 formed in assembly 140.

Figure 2B:
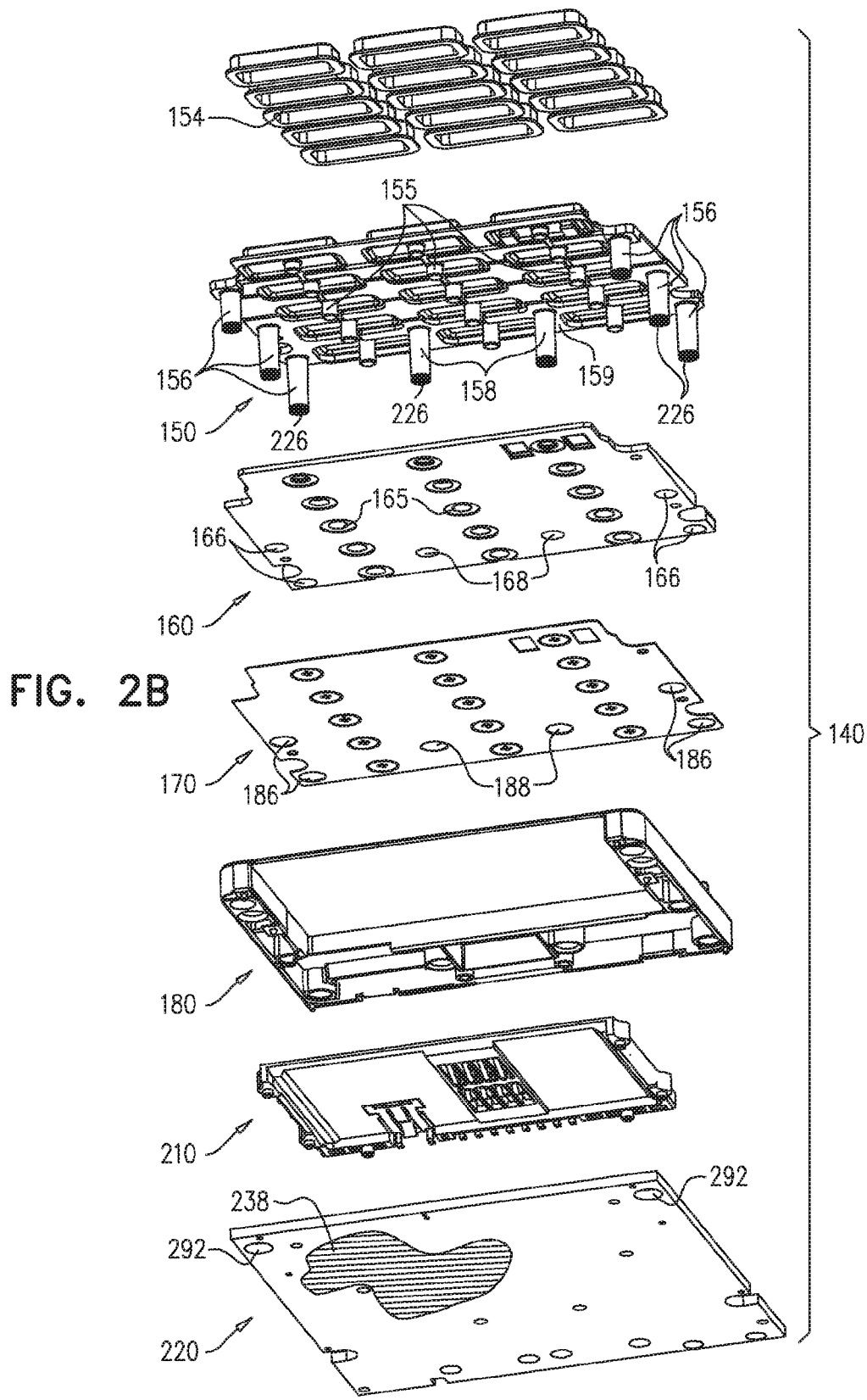

Reference is now made to FIGS. 2A and 2B, which are simplified exploded view illustrations of security volume assembly 140, forming part of the machine readable card data entry device of FIGS. 1A & 1B, taken in respective downward and upward facing directions.

As seen in FIGS. 2A and 2B, the security volume assembly 140 comprises a keypad element 150, preferably formed of a resilient material such as rubber. Keypad element 150 is preferably a unitary element which defines, on a top surface 151 thereof, an array 152 of displaceable keys 153 which are configured to extend through corresponding array 105 of key apertures 106 (FIG. 1A) on top housing element 102. Keypad element 150 may be provided with key covers 154. Each of displaceable keys 153 is preferably formed on an underside thereof with a pin 155.

Keypad element 150 preferably is provided with eight pins, including six edge pins 156 and two interior pins 158. Each of pins 156 and 158 extend from a bottom surface 159 of keypad element 150.

Security volume assembly 140 preferably also includes an apertured light guide layer 160 having apertures 165, 166 and 168 for accommodating respective pins 155, 156 and 158.

Security volume assembly 140 preferably additionally includes an array 170 of domes 172, which are engaged by pins 155 when keys 153 are depressed. Domes are mounted, as by adhesive, such as an adhesive layer 174, or by soldering, onto a contact subassembly 180, which is described hereinbelow in detail with reference to FIGS. 3A-4G.

Adhesive layer 174 includes six apertures, including four edge apertures 186, for accommodating corresponding pins 156 and two interior apertures 188, for accommodating pins 158.

Located within security volume assembly 140 and forming part thereof is a smart card connector assembly 210, various embodiments of which are described hereinbelow with reference to FIGS. 5A-7C, which is mounted on a printed circuit board 220.

It is seen that in accordance with a preferred embodiment of the invention there are provided a plurality of tamper detection switch assemblies 222.

Each tamper detection switch assembly 222 preferably includes a carbon pill 226, which is fixed to the bottom of pins 156 and 158, and a pair of electrical contacts 228, mounted on printed circuit board 220, preferably each including a central conductor 232 and at least one circumferential ring 234, which preferably includes an inner ring 235 and an outer grounded ring 236, either or both of which may include plural segmented ring portions (not shown).

When the housing is closed and top housing portion 102 and bottom housing portion 104 are fully engaged, carbon pills 226, fixed to the bottom surfaces of pins 156 and 158, are positioned so as to short circuit respective electric central conductors 232 and respective at least one circumferential rings 234. Alternatively, carbon pills 226 may be replaced by deformable conductive domes.

In accordance with a preferred embodiment of the present invention, the printed circuit board 220 is formed with a protective anti-tamper mesh 238, which is preferably at least one layer of a dense array of two conductors arranged side by side and is connected to alarm circuitry, described hereinbelow. Printed circuit board 220 is also preferably provided with connectors 240, 242 and 244, which preferably provide an electrical connection between elements on the printed circuit board 220 and flexible cable 141, contact subassembly 180 and flexible cable 143, respectively. Connector 242 is preferably a Zebra connector.

Printed circuit board 220 preferably has mounted thereon a main processor 250 and its memory 252, which may contain highly sensitive information, as well as tamper detection and alarm circuitry 254. Tamper detection and alarm circuitry 254 may be conventional circuitry which provides an alarm, such as an audio or visually sensible alarm, in response to sensed detection of tampering, evidenced, for example by a short circuit or an open circuit in one or more protective mesh, such as mesh 238. Tamper detection and alarm circuitry 254 may also be responsive to tampering for erasing sensitive information and disabling communication of sensitive information.

Preferably, printed circuit board 220 is also formed with a plurality of apertures 290 for precise parallel spacing between smart card connector assembly 210 and printed circuit board 220. Preferably printed circuit board 220 is additionally formed with a pair of apertures 292 for receiving bosses 114 and/or bosses 115.

Figure 3A:
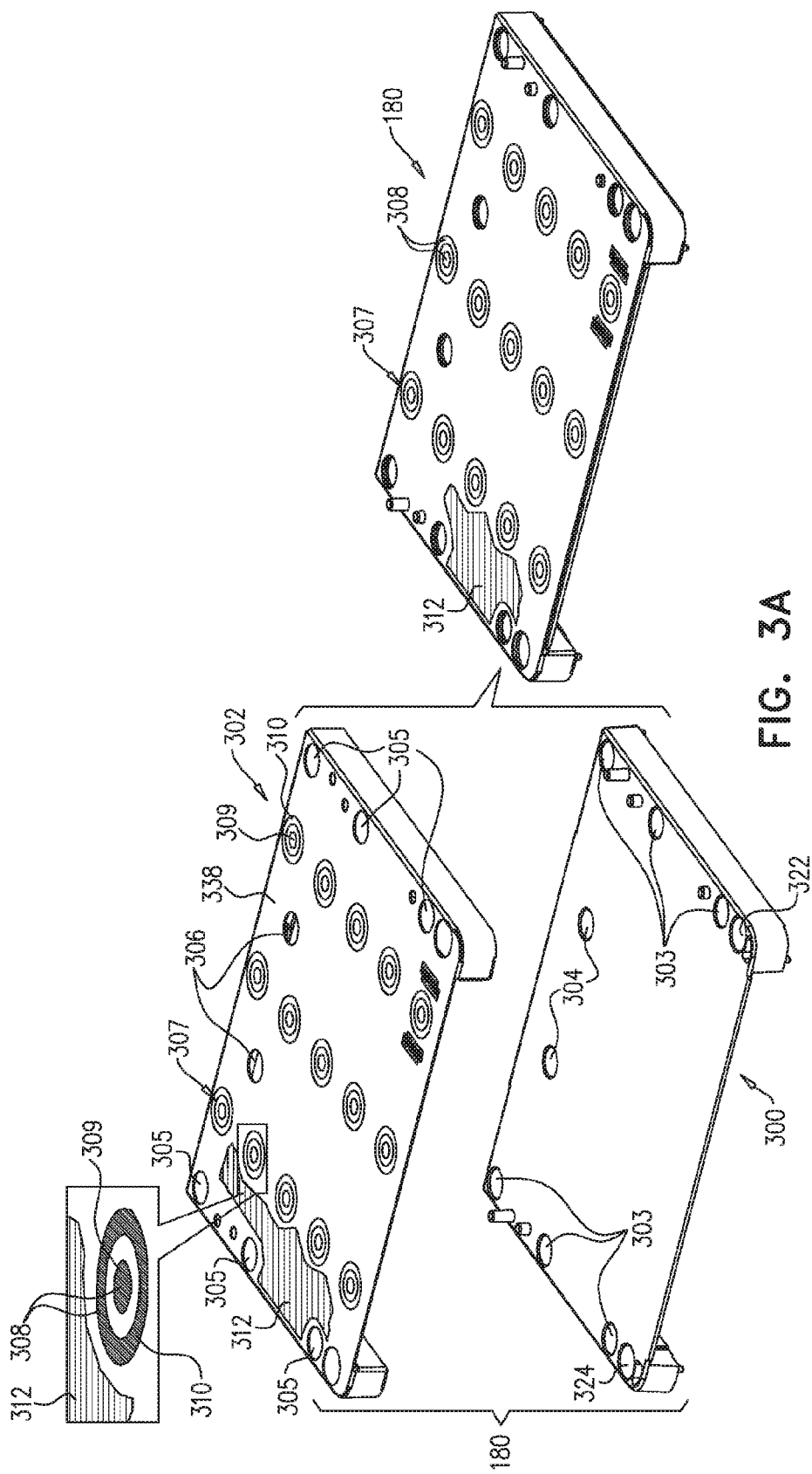
FIGS. 3A and 3B are simplified exploded view illustrations of a subassembly of the security volume assembly of FIGS. 2A & 2B, taken in respective downward and upward facing directions.
Figure 3B:
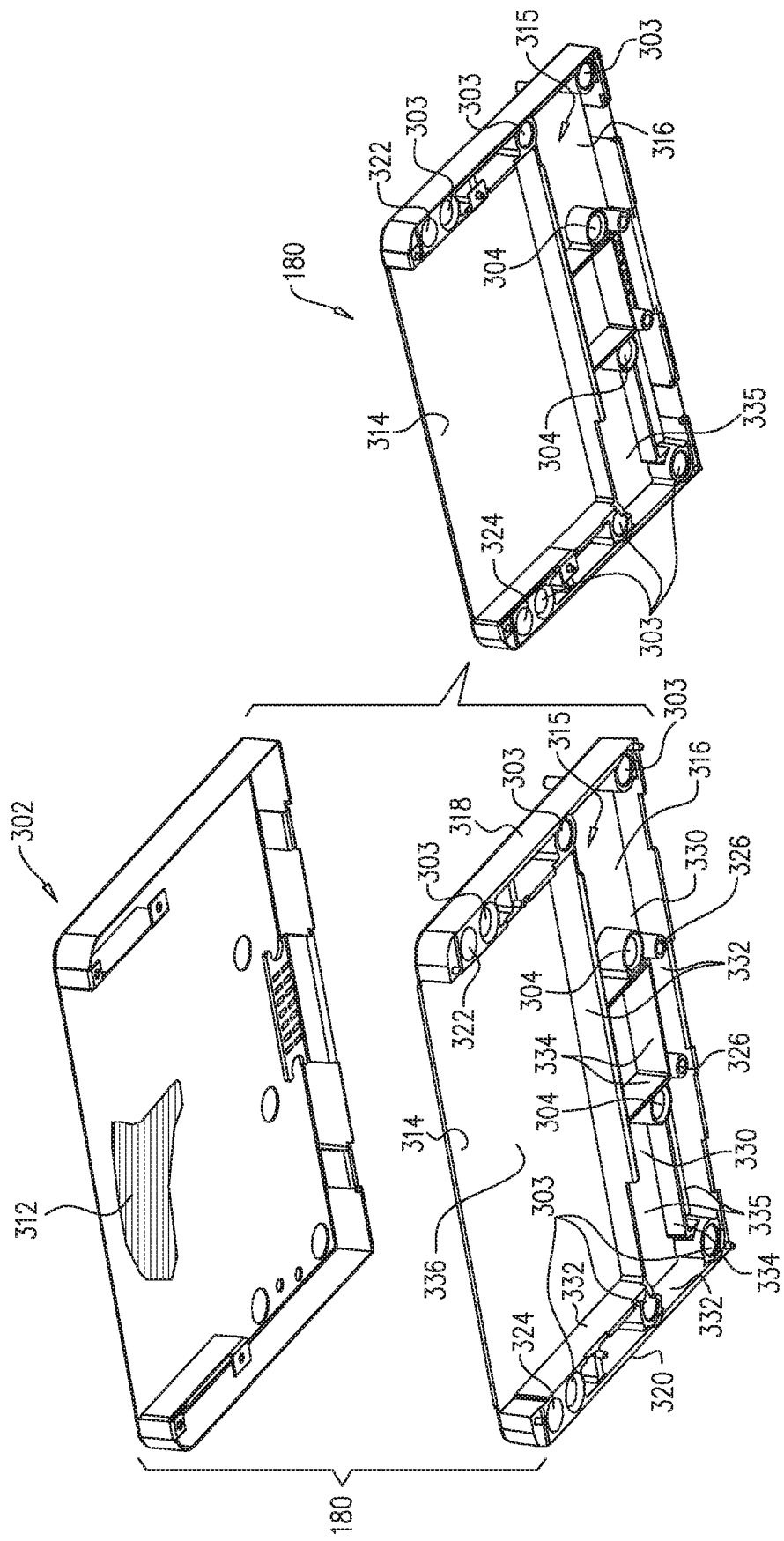

Reference is now made to FIGS. 3A and 3B, which are simplified exploded view illustrations of the contact subassembly 180 of the security volume assembly 140 of FIGS. 2A & 2B, taken in respective downward and upward facing directions, and to FIGS. 3C and 3D, which are simplified planar illustrations of two alternative embodiments of a subsequently folded element forming part of the subassembly of FIGS. 3A & 3B.

As seen in FIGS. 3A & 3B, contact subassembly 180 includes a frame 300, which partially surrounds smart card connector 210 (FIGS. 2A & 2B), and a folded flexible PCB 302, which is wrapped about frame 300. Frame 300 includes eight apertures, including six edge apertures 303, for accommodating corresponding pins 156 and two interior apertures 304, for accommodating corresponding pins 158.

Folded flexible PCB 302 includes eight apertures, including six edge apertures 305, corresponding to apertures 303, for accommodating corresponding pins 156, and two interior apertures 306, corresponding to apertures 304, for accommodating corresponding pins 158.

Folded flexible PCB 302 preferably includes an array 307 of electrical contacts 308, preferably each including a central conductor 309 and at least one circumferential ring 310, which are short circuited by engagement therewith of respective domes 172 upon depression of respective keys 153 and resulting deformation of domes 172 by pins 155 of respective keys 153.

Folded flexible PCB 302 preferably further includes a protective anti-tamper mesh 312, preferably formed as at least one layer of a dense array of two electrical conductors arranged side by side and coupled to an alarm circuit, which is described hereinbelow.

As seen particularly in FIG. 3B, an underside of frame 300 includes a generally flat main portion 314 surrounded on three sides by a U-shaped support portion 315, including a central portion 316 and a pair of arms 318 and 320, extending perpendicularly therefrom. Arms 318 and 320 are each also formed with corresponding throughgoing apertures 322 and 324, respectively.

Central portion 316 may also be provided with a pair of internally threaded apertured bosses 326 for accommodating screws (not shown) which connect contact subassembly 180 of the security volume assembly 140 to PCB 220 and which assist in securing zebra connector 242 in place.

U-shaped support portion 315 has a generally recessed flat bottom surface 330, surrounded by an upstanding peripheral wall 332. Anti-tamper mesh 312, peripheral wall 332, a plurality of internal walls 334 and the anti-tamper mesh 238 on the printed circuit board 220 define a number of protected enclosures 335 in which various electronic components, such as magnetic stripe reader connector 142 and corresponding connector 240, LCD connector 144 and corresponding connector 244, main processor 250 and memory 252, which may contain highly sensitive information, such as encryption keys, and tamper detection and alarm circuitry 254 may be located. Zebra connector 242 (FIG. 2A) is preferably located between bosses 326, peripheral wall 332 and one of internal walls 334.

It is appreciated that anti-tamper mesh 312, generally flat main portion 314 and upstanding peripheral wall 332 and the anti-tamper mesh 238 on the printed circuit board 220 together define a protected zone 336 in which smart card connector assembly 210 is located.

If the main processor 250 is a stand-alone secure processor, it may be located outside of a protected zone.

As seen in FIG. 3C, in one embodiment of the invention, the folded, flexible PCB 302, here shown in a flat state as indicated by reference numeral 344, includes two layers 346 and 348, preferably having respective protective anti-tamper meshes 350 and 352 along substantially their entire surfaces, each of protective anti-tamper meshes 350 and 352 being preferably formed of a dense array of pairs of side-by-side conductors which are coupled to tamper detection and alarm circuitry 254.

Layer 346 preferably includes array 307 of electrical contacts 308, each including each including a central conductor 309 and at least one circumferential ring 310, and is formed with edge apertures 305 and internal apertures 306. Layer 346 also includes conductors 356 which connect each circumferential ring 310 to a corresponding connector pad 358.

Layer 348 preferably includes an array 360 of pads 362, each of which underlies central conductor 309 and is coupled thereto by a via 364. Each of pads 362 is preferably connected by an electrical conductor 365 to a corresponding connector pad 366.

Anti-tamper mesh 350 preferably substantially surrounds each of electrical contacts 308, as well as edge apertures 305 and internal apertures 306, and provides anti-tamper protection thereto. Anti-tamper mesh 350 also protects electrical conductors 365 from above. This is important since electrical conductors 365 normally carry signals representing key presses, which may contain sensitive PIN (Personal Identification Number) information.

Anti-tamper mesh 352 preferably substantially surrounds each of pads 362, electrical conductors 365 and connector pads 366 as well as edge apertures 305 and internal apertures 306 and provides anti-tamper protection thereto.

Figure 3D:
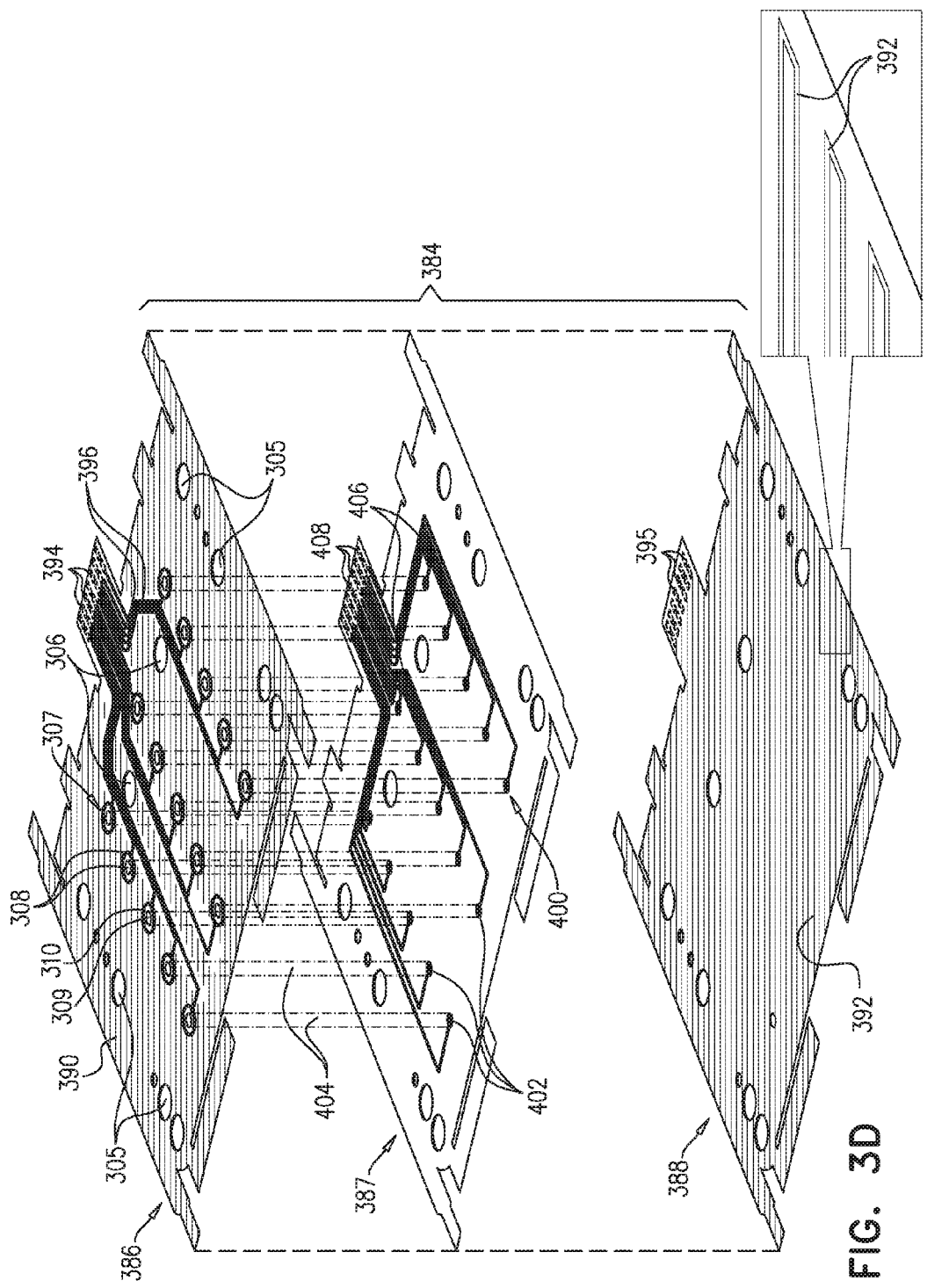

As seen in FIG. 3D, in another embodiment of the invention, the folded flexible PCB, here shown in a flat state as indicated by reference numeral 384, includes three layers 386, 387 and 388. Layer 386 may be identical to layer 346 of the embodiment of FIG. 3C.

Layers 386 and 388 preferably having respective protective anti-tamper meshes 390 and 392 along substantially their entire surfaces. Each of protective anti-tamper meshes 390 and 392 is preferably formed of a dense array of pairs of side-by-side conductors which are coupled to tamper detection and alarm circuitry 254 via respective connector pads 394 and 395. Preferably one of the side-by-side conductors in each pair may be connected to ground, while the other of the side-by-side conductors in each pair may be coupled to a voltage other than ground and preferably carries an anti-tamper signal.

Layer 386 preferably includes array 307 of electrical contacts 308, each including each including a central conductor 309 and at least one circumferential ring 310, and is formed with edge apertures 305 and internal apertures 306. Layer 386 also includes conductors 396 which connect each circumferential ring 310 to a corresponding connector pad 398.

Layer 387 preferably includes an array 400 of pads 402, each of which underlies central conductor 309 and is coupled thereto by a via 404. Each of pads 402 is preferably connected by an electrical conductor 406 to a corresponding connector pad 408.

Anti-tamper mesh 390 preferably substantially surrounds each of electrical contacts 308, as well as edge apertures 305 and internal apertures 306, and provides anti-tamper protection thereto. Anti-tamper mesh 390 also protects electrical conductors 406 from above. This is important since electrical conductors 406 normally carry signals representing key presses, which may contain sensitive PIN (Personal Identification Number) information.

Anti-tamper mesh 392 preferably protects array 307 of electrical contacts 308, electrical conductors 396 and array 400 of pads 402 and electrical conductors 406 from below.

Reference is now made to FIGS. 4A, 4B, 4C, 4D, 4E and 4F, which are simplified illustrations of steps in folding of folded flexible PCB 302 of either of the embodiments shown in FIGS. 3C & 3D.

Figure 4A:
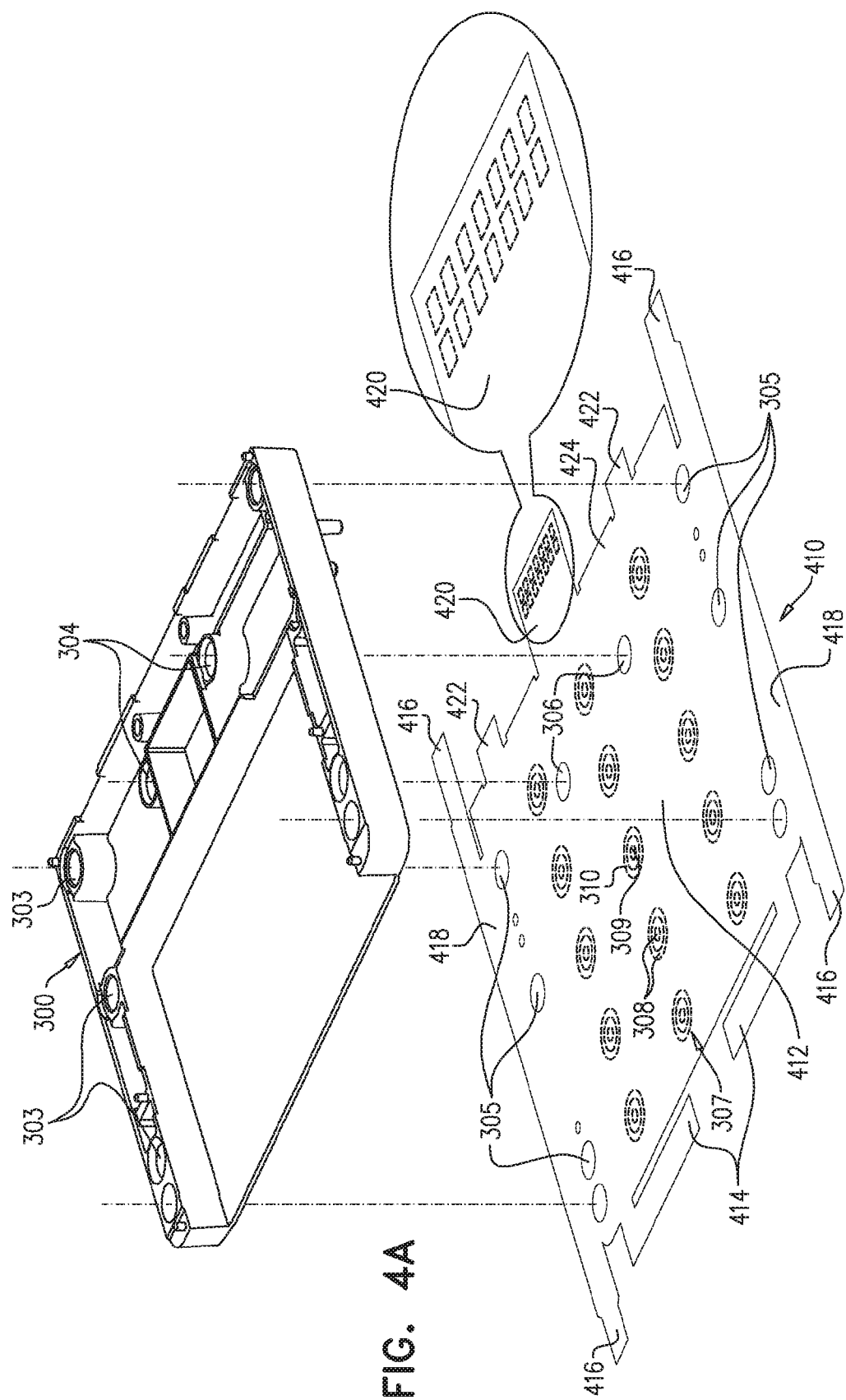

As seen in FIG. 4A, prior to folding, flexible PCB 302, is a generally flat multi-layer PCB 410 of generally rectangular configuration. Generally flat multi-layer PCB 410 preferably includes a main portion 412 having formed on an underside surface thereof (in the sense of FIG. 4A) array 307 of electrical contacts 308, each including each including a central conductor 309 and at least one circumferential ring 310. Main portion 412 is formed with edge apertures 305 and internal apertures 306.

Extending outwardly from main portion 412 are a pair of forward edge flaps 414, four corner flaps 416, two side edge flaps 418, a connector flap 420, a pair of fold over back flaps 422 and a back edge flap 424. It is appreciated that preferably all of the above flaps are provided with anti-tamper meshes along substantially the entire extent thereof.

As seen in FIGS. 4A and 4B, frame 300 is initially aligned over main portion 412, such that apertures 305 and 306 of the multi-layer PCB 410 are aligned with corresponding apertures 303 and 304 of the frame 300.

As seen in FIG. 4C, preferably side flaps 418 are folded up over corresponding side edge surfaces of frame 300. As seen in FIG. 4D, preferably corner flaps 416 are folded over both front corner surfaces of frame 300 and adjacent portions of peripheral wall surface 332 and over corner portions of a back edge surface of frame 300.

FIG. 4E shows that forward edge flaps 414 are folded up over those portions of flaps 416 which extend along peripheral wall surface 332. Folded forward edge flaps 414 also extend further inwardly along peripheral wall surface 332 beyond flaps 416. FIG. 4E also shows that the connector flap 420 and pair of fold over back flaps 422 and the back edge flap 424 are raised and folded over back surface of frame 300.

FIG. 4F shows back flaps 422 folded over corresponding back portions of peripheral wall surface 332 and connector flap 420 being double folded so as to be located within one of protected enclosures 335 between bosses 326.

It is a particular feature of an embodiment of the present invention that there is provided a security volume, which in the illustrated embodiment is defined by anti-tamper meshes 238 and 312, which encloses at least part of the printed circuit board, at least part of the smartcard connector and a plurality of keypad contacts. Tamper detection switch assemblies 222 extend through apertures in anti-tamper meshes 312 and provide further protection for the security volume.

It is also a particular feature of the present invention that the security volume is defined at least in part by a folded single flexible PCB, which provides protection for at least one planar surface of the volume and wherein side folded edges of the PCB provide side edge protection to the enclosure.

Figure 5A:
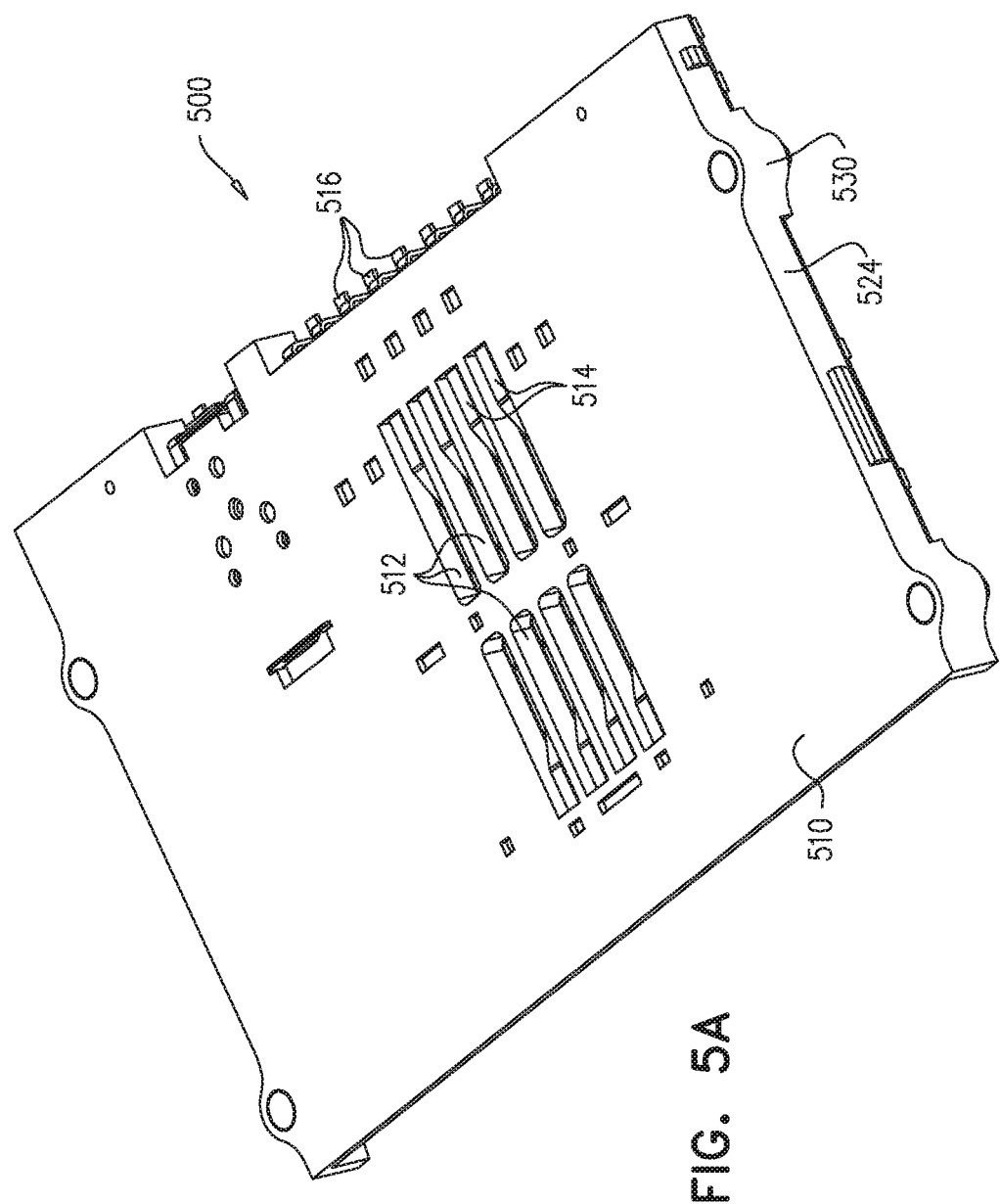
FIGS. 5A and 5B are simplified pictorial illustrations of a first embodiment of another subassembly of the security volume assembly shown in FIGS. 2A & 2B, taken in respective downward and upward facing directions.
Figure 5B:
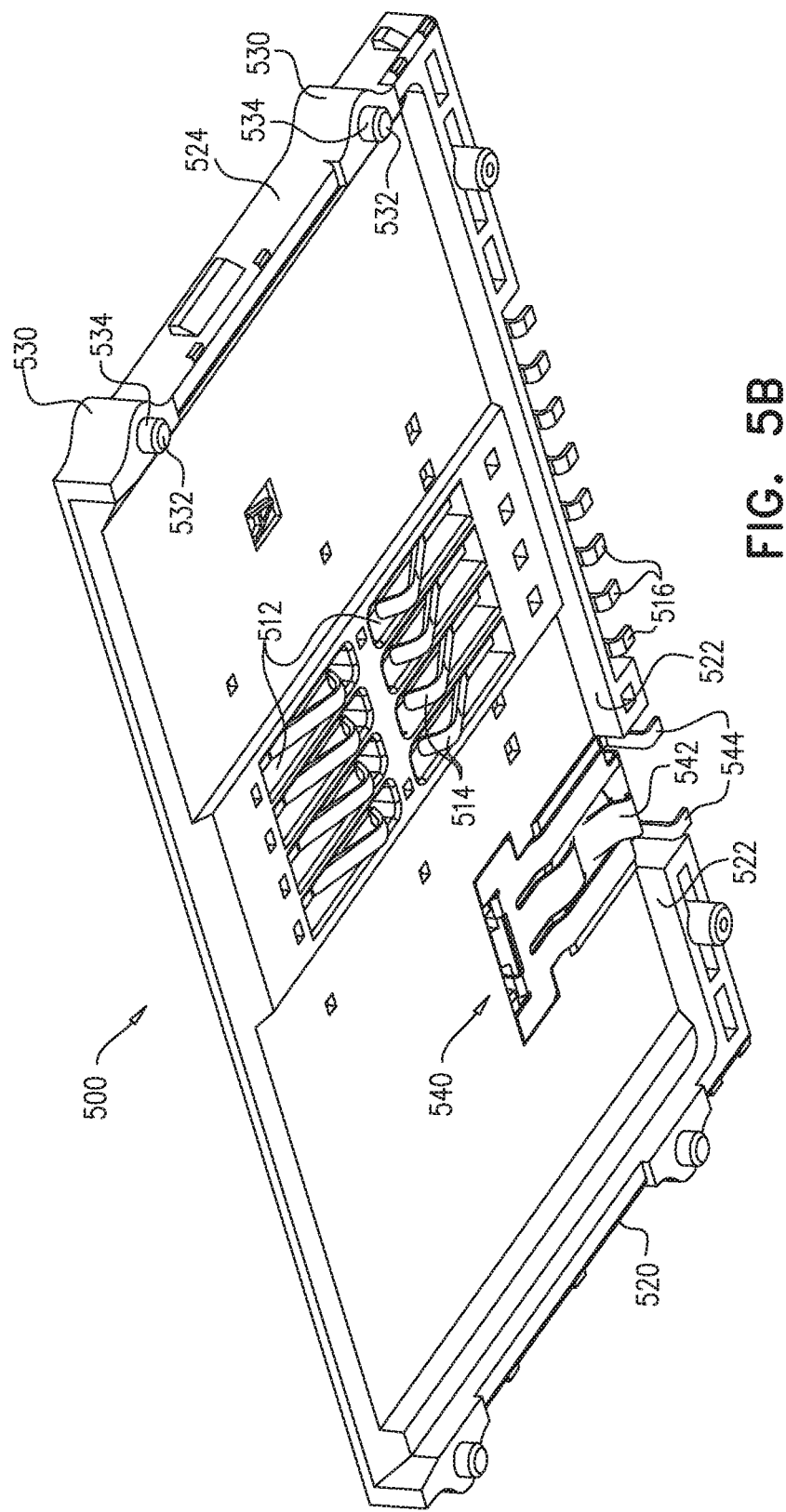

Reference is now made to FIGS. 5A and 5B, which are simplified exploded view illustrations of a first embodiment 500 of smart card connector assembly 210 (FIGS. 2A & 2B), of the security volume assembly 140 shown in FIGS. 2A & 2B, taken in respective downward and upward facing directions, and to FIG. 5C, which is a simplified assembled view illustration of the subassembly of FIGS. 5A & 5B together with printed circuit board 220, shown in FIGS. 1A-2B, cooperating therewith.

As seen in FIGS. 5A-5C, the smart card connector assembly 500 includes a generally rectangular slot surface defining element 510 typically formed of plastic and including an array of eight apertures 512, each of which accommodates a smart card reading spring contact 514. Each of smart card reading spring contacts 514 is coupled to a corresponding electrical edge contact 516. Generally rectangular slot surface defining element 510 is preferably formed with depending wall portions 520, 522 and 524 along three edges thereof.

Adjacent corners of slot surface defining element 510 there are side protrusions 530, each of which is formed with a downward facing peg 532 having a circumferential wall surface 534. Pegs 532 are configured for insertion into apertures 290 on printed circuit board 220 to provide precise parallel spacing between slot surface defining element 510 and printed circuit board 220. Alternatively, protrusions 530 may be obviated and pegs 532 may be formed on a downward facing surface of slot surface defining element 510 adjacent corners thereof. Optionally, additional pegs 532 may be included on a downward facing surface of slot surface defining element 510.

An additional spring contact assembly 540, including a spring contact finger 542, is also mounted on slot surface defining element 510 and is connected to electrical edge contacts 544. Assembly 540 is operative for card entry detection.

Turning particularly to FIG. 5C, it is seen that slot surface defining element 510 is mounted in parallel precise propinquity to printed circuit board 220 by inserting pegs 532 into apertures 290 on printed circuit board 220, thereby defining a smart card read/write slot 550, which corresponds to smart card read/write slot 145 (FIGS. 1A & 1B).

It is a particular feature of this embodiment of the present invention that a significant reduction in the thickness of the smart card reader device is realized by defining slot 550 between slot surface defining element 510 and printed circuit board 220. A preferred embodiment has an overall thickness of 2.5 mm from the top surface of the printed circuit board 220 to the upward facing surface of slot surface defining element 510.

It is a particular feature of the embodiment of FIGS. 5A & 5B that the smart card connector 500 cooperates with printed circuit board 220 to define a smart card reading volume into which a smart card is inserted via slot 550 for reading thereof.

Figure 6A:
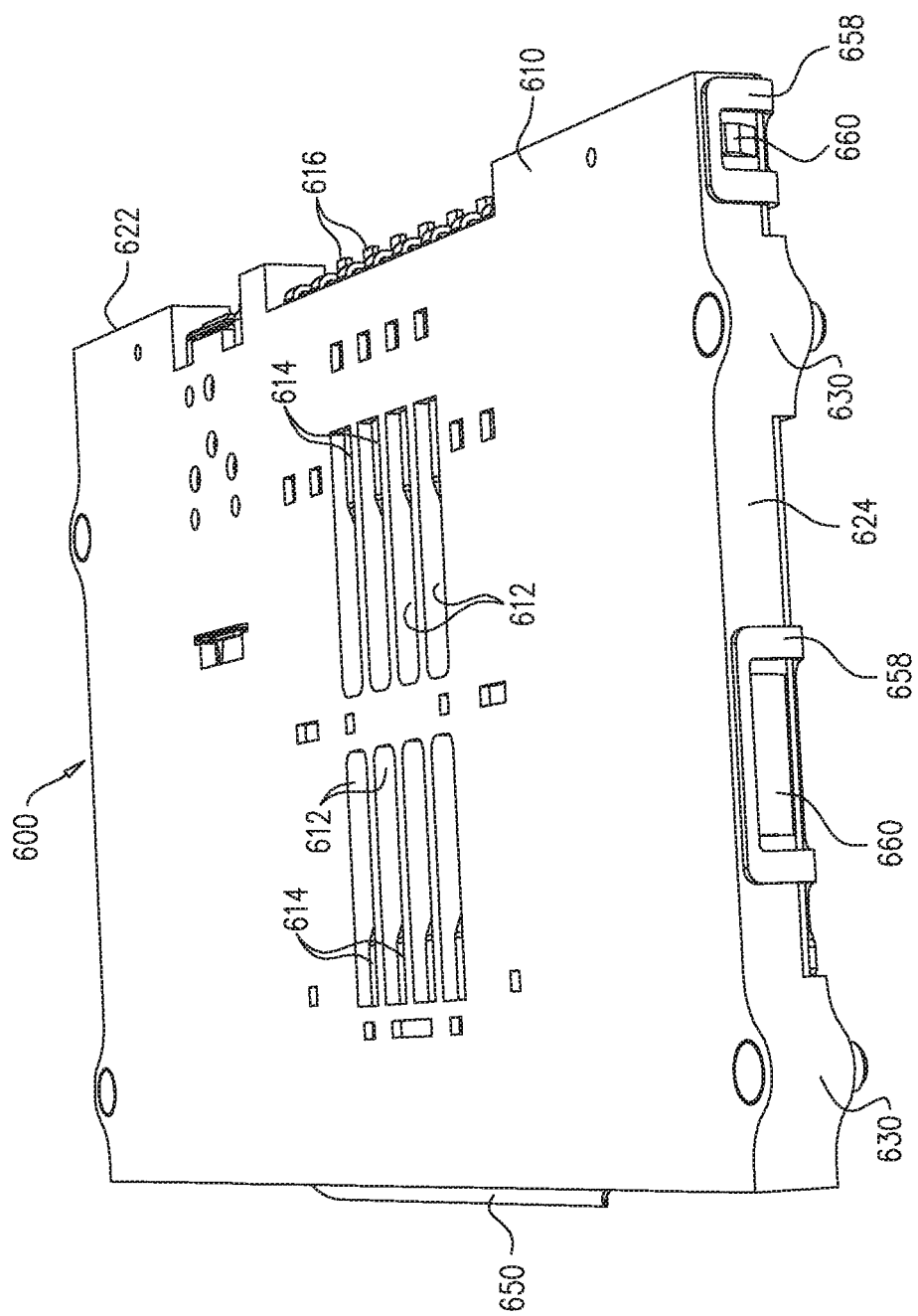
FIGS. 6A and 6B are simplified view illustrations of a second embodiment of another subassembly of the security volume assembly shown in FIGS. 2A & 2B, taken in respective downward and upward facing directions.
Figure 6B:
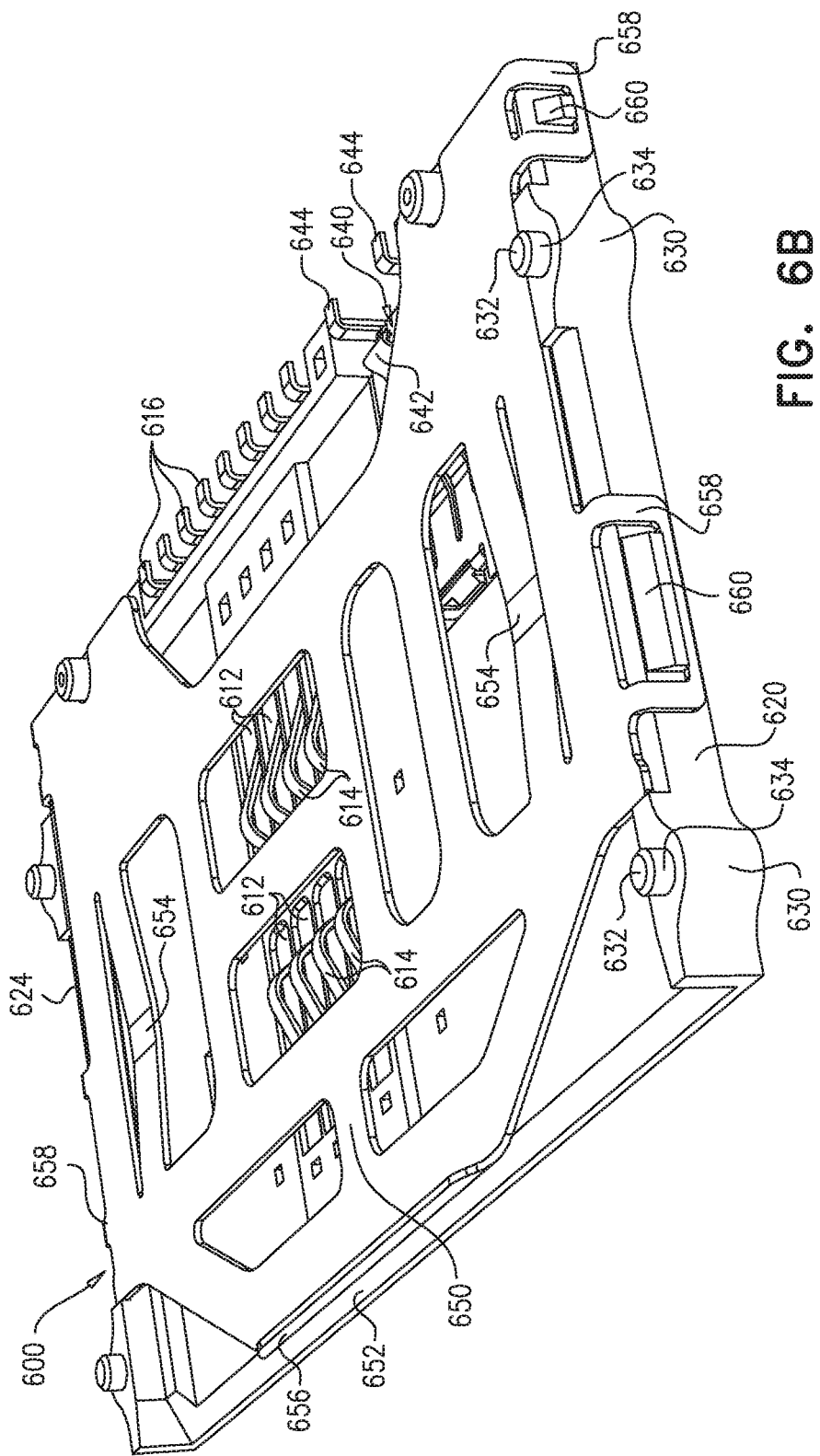
Figure 6C:
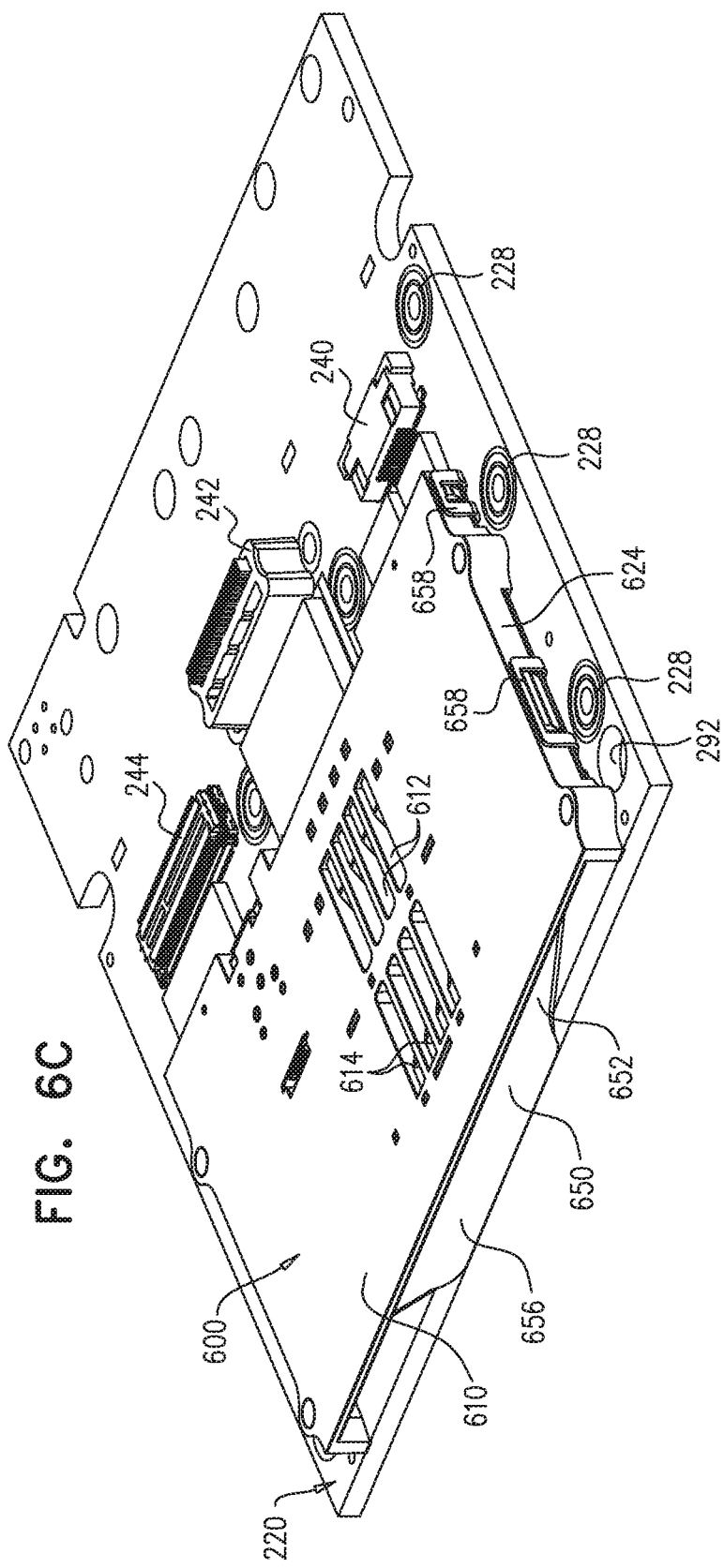
FIG. 6C is a simplified assembled view illustration of the subassembly of FIGS. 6A & 6B together with a printed circuit board shown in FIGS. 1A-2B, cooperating therewith.

Reference is now made to FIGS. 6A and 6B, which are simplified exploded view illustrations of a second embodiment 600 of smart card connector assembly 210 (FIGS. 2A & 2B), of the security volume assembly 140 shown in FIGS. 2A & 2B, taken in respective downward and upward facing directions, to FIG. 6C, which is a simplified assembled view illustration of the subassembly of FIGS. 6A & 6B together with printed circuit board 220, shown in FIGS. 1A-2B, cooperating therewith, and to FIG. 6D, which is a simplified exploded view illustration of the subassembly of FIGS. 6A and 6B.

As seen in FIGS. 6A-6D, the smart card connector assembly 600 includes a generally rectangular slot surface defining element 610 typically formed of plastic and including an array of eight apertures 612, each of which accommodates a smart card reading spring contact 614. Each of smart card reading spring contacts 614 is coupled to a corresponding electrical edge contact 616. Generally rectangular slot surface defining element 610 is preferably formed with depending wall portions 620, 622 and 624 along three edges thereof.

Adjacent corners of slot surface defining element 610 are formed side protrusions 630, each of which is formed with a downward facing peg 632 having a circumferential wall surface 634. Pegs 632 are configured for insertion into apertures 290 on printed circuit board 220 to provide precise parallel spacing between slot surface defining element 610 and printed circuit board 220. Alternatively, protrusions 630 may be obviated and pegs 632 may be formed on a downward facing surface of slot surface defining element 610 adjacent corners thereof. Optionally, additional pegs 632 may be included on a downward facing surface of slot surface defining element 610.

An additional spring contact assembly 640, including a spring contact finger 642, is also mounted on slot surface defining element 610, which is connected to electrical edge contacts 644. Assembly 640 is operative for card entry detection.

As distinguished from the embodiment of FIGS. 5A-5C, and as seen particularly in FIGS. 6B and 6C, the smart card connector assembly 600 of FIGS. 6A-6D also includes an apertured metal underplate 650 which provides electrical static discharge and also defines a smart card read/write slot 652, which corresponds to slot 145 (FIGS. 1A & 1B). Additionally, underplate 650 provides enhanced structural integrity to the smart card connector assembly 650.

A pair of springs 654 are integrally formed with underplate 650 and serve to urge a smart card upwardly such that electrical contacts of the smart card (not shown) engage smart card reading spring contacts 614. Springs 654 may also provide electrostatic discharge.

Preferably, underplate 650 is formed with a lip 656 for engagement with an edge of printed circuit board 220. Additionally, underplate 650 is preferably provided with two pairs of side engagement portions 658 for engagement with corresponding protrusions 660 on wall portions 620 and 624 of the smart card connector assembly 600.

It is a particular feature of this embodiment of the present invention that a significant reduction in the thickness of the smart card reader device is realized by defining slot 652 between slot surface defining element 610 and metal underplate 650. A preferred embodiment has an overall thickness of 2.8 mm from the top surface of the printed circuit board 220 to the upward facing surface of slot surface defining element 610.

It is a particular feature of the embodiment of FIGS. 6A & 6B that the smart card connector 600 cooperates with underplate 650 to define a smart card reading volume into which a smart card is inserted via slot 652 for reading thereof.

Figure 7A:
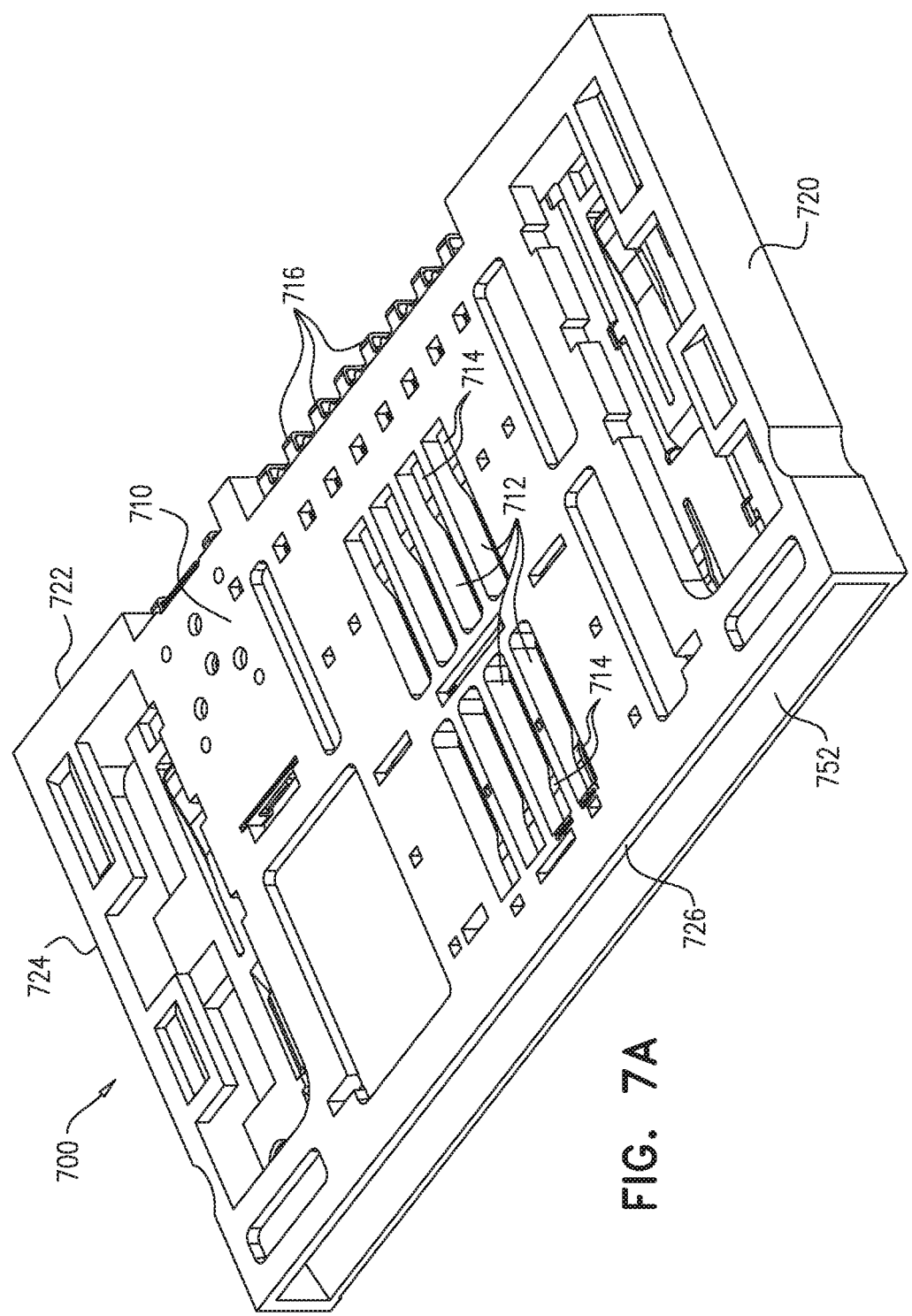
FIGS. 7A and 7B are simplified view illustrations of a third embodiment of another subassembly of the security volume assembly shown in FIGS. 2A & 2B, taken in respective downward and upward facing directions.
Figure 7B:
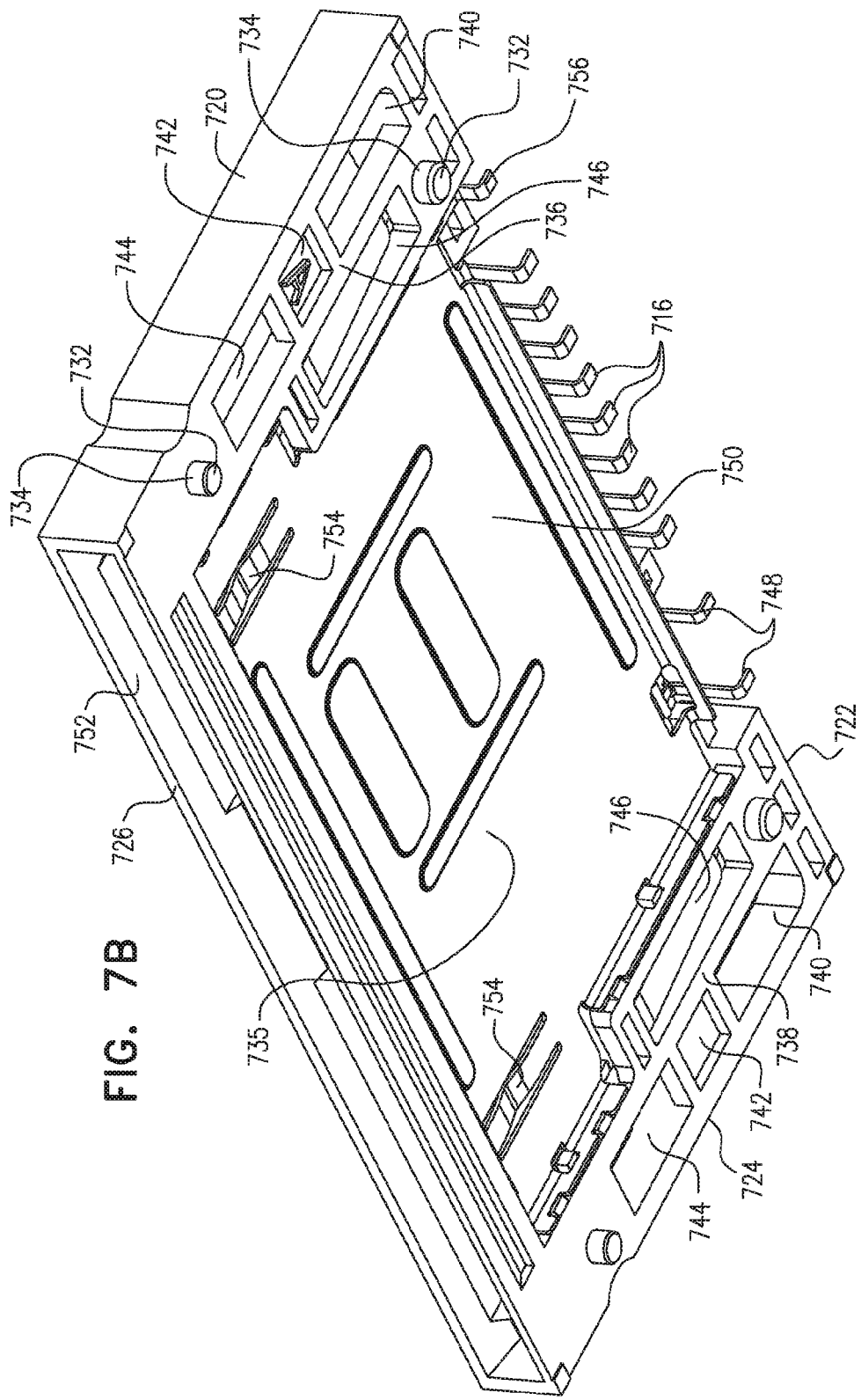
Figure 7C:
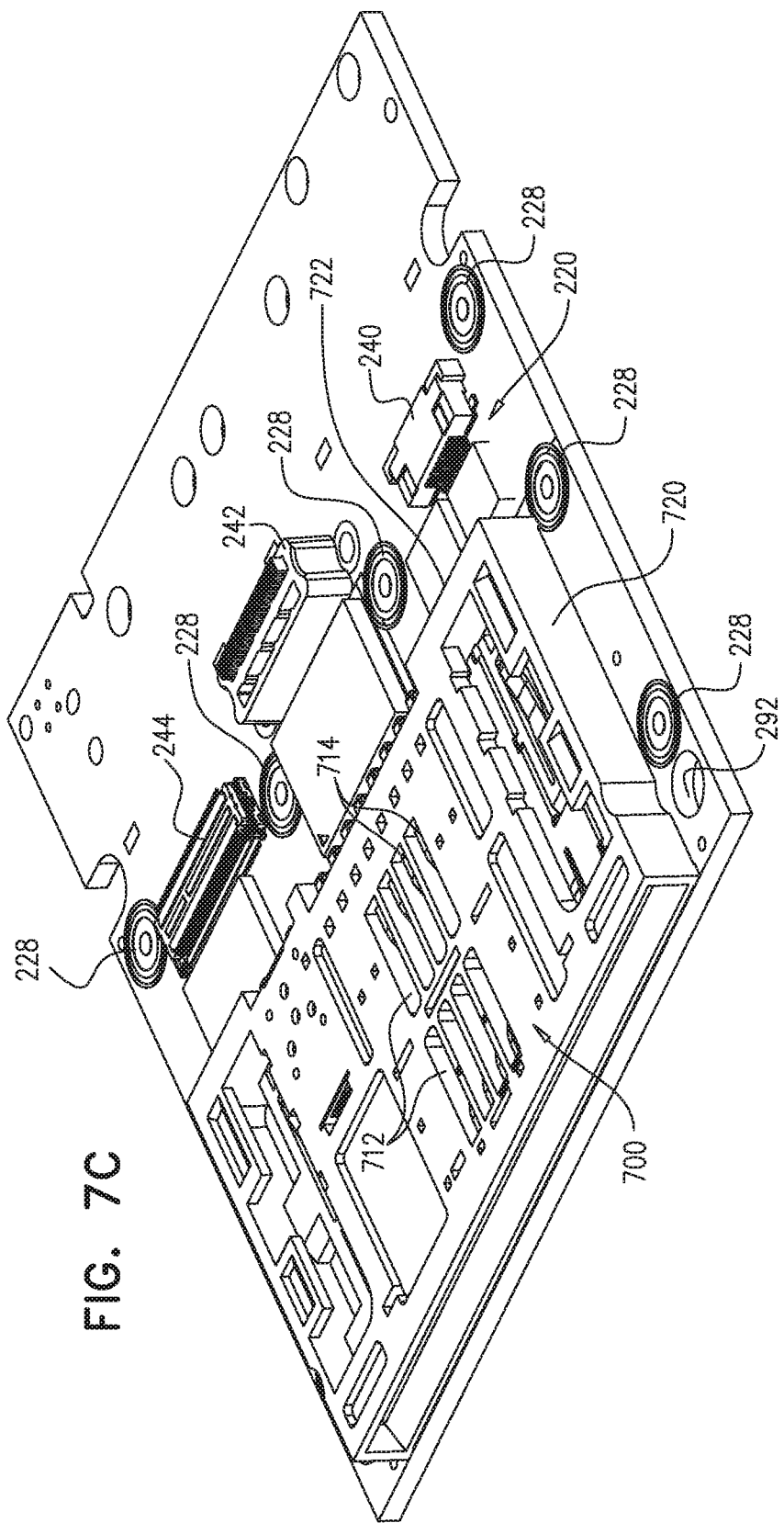
FIG. 7C is a simplified assembled view illustration of the subassembly of FIGS. 7A & 7B together with a printed circuit board shown in FIGS. 1A-2B, cooperating therewith.

Reference is now made to FIGS. 7A and 7B, which are simplified exploded view illustrations of a third embodiment 700 of smart card connector assembly 210 (FIGS. 2A & 2B) of the security volume assembly shown in FIGS. 2A & 2B, taken in respective downward and upward facing directions, and to FIG. 7C, which is a simplified assembled view illustration of the subassembly of FIGS. 7A & 7B together with printed circuit board 220, shown in FIGS. 1A-2B, cooperating therewith.

As seen in FIGS. 7A-7C, smart card connector assembly 700 includes a generally rectangular element 710, typically formed of plastic and including an array of eight apertures 712, each of which accommodates a smart card reading spring contact 714. Each of smart card reading spring contacts 714 is coupled to a corresponding electrical edge contact 716.

Generally rectangular element 710 is preferably formed with depending wall portions 720, 722 and 724 along three edges thereof and with a slot opening defining edge portion 726.

Formed on an underside surface of element 710 are downward facing pegs 732, each having a circumferential wall surface 734. Pegs 732 are configured for insertion into apertures 290 on printed circuit board 220 to provide parallel spacing between element 710 and printed circuit board 220. It is seen in FIG. 7B that a bottom side of element 710 includes a main recess 735, which is bordered by raised side portions 736 and 738, each of which may have multiple openings, such as those designated by reference numerals 740, 742, 744 and 746 for accommodating additional components within the security volume assembly 140 (FIGS. 1A & 1B).

An additional spring contact assembly (not shown), including a spring contact finger (not shown), is also mounted on element 710 and is connected to electrical edge contacts 748. This assembly is operative for card entry detection.

As distinguished from the embodiment of FIGS. 5A-5C, and as seen particularly in FIGS. 7A and 7C, smart card connector assembly 700 of FIGS. 7A-7C also includes an apertured metal underplate 750, which may be molded into element 710 and defines the floor of main recess 735.

Underplate 750 and element 710 together define smart card read/write slot 752, which corresponds to slot 145 (FIGS. 1A & 1B). Underplate 750 may include spring fingers 754, similar to springs 654 in the metal plate in FIG. 6D, which preferably push a smart card located in slot 752 into reading engagement with spring contacts 714 and may also provide electrical static discharge. Additionally, underplate 750 provides enhanced structural integrity to the smart card connector assembly 700. An electrical edge contact 756 is connected to metal underplate 750 for grounding and electrical static discharge protection.

It is a particular feature of embodiments of the present invention that the keypad element 150 and the array 170 of domes 172, the array 307 of electrical contacts 308 and the smart card connector 210 are all located on the same side of the printed circuit board 220.

It is a particular feature of the present invention that electrical contacts 228 of tamper detection switch assemblies 222 are aligned with each one of pins 156 and 158 and corresponding apertures 166 & 168, 186 & 188 and 305 & 306, such that, in the absence of tampering, carbon pills 226 fixed to the bottom surfaces of pins 156 and 158, extend through respective apertures 166 & 168, 186 & 188 and 305 & 306, into circuit closing engagement with central conductor 232 and at least one of at least one circumferential ring 234 of electrical contact arrays 228. If the housing is opened, this electrical engagement is interrupted, producing an alarm.

It is a particular feature of this embodiment of the present invention that pins 156 and 158 extend through at least one protective anti-tamper mesh and thus provide mutual protection.

It is a further particular feature of an embodiment of the present invention that the protective security anti-tamper mesh 312, which is connected to tamper detection and alarm circuitry 254, protects connections to the various electrical contacts 228, connectors 240, 242 and 244 and also protects smart card reading spring contacts, 514, 614 and 714 and electrical edge contacts 516, 616 and 716 from tampering.

It is a further particular feature of an embodiment of the present invention that security volume assembly 140 is protected by at least one zebra connector 242, a plurality of tamper detection switch assemblies 222 and a multi-layer flexible circuit board 302 including at least one protective security anti-tamper mesh 312, which is connected to tamper detection and alarm circuitry 254, and wherein protective security anti-tamper mesh 312 protects the plurality of tamper detection switch assemblies 222 and zebra connector 242 from unauthorized access. Zebra connector 242 and the plurality of tamper detection switch assemblies 222 together protect the protective security anti-tamper mesh 312 from being removed or lifted.

It is appreciated that anti-tamper meshes 238 and 312 and tamper detection switch assemblies 222 are preferably all connected to tamper detection and alarm circuitry 254.

It will be appreciated by persons skilled in the art that the present invention is not limited by what has been particularly shown and described hereinabove. Rather the scope of the present invention includes combinations and subcombinations of features described above as well as modifications and improvements thereof that are not in the prior art.

The invention claimed is:

1. A secure smartcard reader comprising:
    a smartcard connector; and
    a flexible printed circuit board wrapped around and at least partially surrounding said smartcard connector and at least partially defining a security volume enclosing said smartcard connector,
    said wrapped flexible printed circuit board defining on an outer-facing surface thereof a plurality of keypad contacts,
    said wrapped flexible printed circuit board defining electrical conductors connecting said plurality of keypad contacts to connector pads, and
    said wrapped flexible printed circuit board defining a protective anti-tamper mesh protecting said electrical conductors.

2. The secure smartcard reader according to claim 1 and also comprising tamper detection and alarm circuitry which is coupled to said protective anti-tamper mesh.

3. The secure smartcard reader according to claim 2 and also comprising a keypad element cooperating with said plurality of keypad contacts.

4. The secure smartcard reader according to claim 3 and also comprising:
    a rigid printed circuit board, which, together with said wrapped flexible printed circuit board, fully defines said security volume.

5. The secure smartcard reader according to claim 2 and also comprising:
    a rigid printed circuit board, which, together with said wrapped flexible printed circuit board, fully defines said security volume.

6. The secure smartcard reader according to claim 5 and wherein said rigid printed circuit board also comprises a protective anti-tamper mesh.

7. The secure smartcard reader according to claim 5 and wherein said rigid printed circuit board has first and second surfaces and both said smartcard connector and said plurality of keypad contacts are located adjacent said first surface of said printed circuit board.

8. The secure smartcard reader according to claim 5 and wherein said rigid printed circuit board has first and second surfaces and said security volume is located alongside said first surface.

9. The secure smartcard reader according to claim 2 and wherein said wrapped flexible printed circuit board comprises at least inner and outer conductive layers, said at least outer conductive layer including at least a portion of said protective anti-tamper mesh and said at least inner conductive layer including at least some of said electrical conductors connecting said plurality of keypad contacts to connector pads.

10. The secure smartcard reader according to claim 9 and wherein said at least inner conductive layer includes ones of said electrical conductors which carry signals representing key presses.

11. The secure smartcard reader according to claim 2 and also comprising at least one tamper detector switch assembly which extends through at least one corresponding aperture in said wrapped flexible printed circuit board to normally engage at least one corresponding electrical contact.

12. The secure smartcard reader according to claim 1 and also comprising a keypad element cooperating with said plurality of keypad contacts.

13. The secure smartcard reader according to claim 12 and also comprising:

a rigid printed circuit board, which, together with said wrapped flexible printed circuit board, fully defines said security volume.

14. The secure smartcard reader according to claim 1 and also comprising:
a rigid printed circuit board, which, together with said wrapped flexible printed circuit board, fully defines said security volume.

15. The secure smartcard reader according to claim 14 and wherein said rigid printed circuit board also comprises a protective anti-tamper mesh.

16. The secure smartcard reader according to claim 14 and wherein said rigid printed circuit board has first and second surfaces and both said smartcard connector and said plurality of keypad contacts are located adjacent said first surface of said rigid printed circuit board.

17. The secure smartcard reader according to claim 14 and wherein said rigid printed circuit board has first and second surfaces and said security volume is located alongside said first surface.

18. The secure smartcard reader according to claim 1 and wherein said wrapped flexible printed circuit board comprises at least inner and outer conductive layers, said at least outer conductive layer including at least a portion of said protective anti-tamper mesh and said at least inner conductive layer including at least some of said electrical conductors connecting said plurality of keypad contacts to connector pads.

19. The secure smartcard reader according to claim 18 and wherein said at least inner conductive layer includes ones of said electrical conductors which carry signals representing key presses.

20. The secure smartcard reader according to claim 1 and also comprising at least one tamper detector switch assembly which extends through at least one corresponding aperture in said wrapped flexible printed circuit board to normally engage at least one corresponding electrical contact.

* * * * *